(12) United States Patent
Fuchikami et al.

(10) Patent No.: US 9,983,840 B2
(45) Date of Patent: May 29, 2018

(54) HEAD-MOUNTED DISPLAY APPARATUS WORN ON USER'S HEAD

(71) Applicant: Panasonic Intellectual Property Corporation of America, Torrance, CA (US)

(72) Inventors: Tetsuji Fuchikami, Osaka (JP); Kazuki Funase, Osaka (JP); Akinori Ozeki, Osaka (JP); Hideshi Aoki, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 54 days.

(21) Appl. No.: 15/131,902

(22) Filed: Apr. 18, 2016

(65) Prior Publication Data

US 2016/0313956 A1    Oct. 27, 2016

(30) Foreign Application Priority Data

Apr. 24, 2015 (JP) ................................. 2015-089815

(51) Int. Cl.
*G09G 5/00* (2006.01)
*G06F 3/14* (2006.01)
*G06F 3/16* (2006.01)
*G06F 3/0488* (2013.01)
*G06F 3/0481* (2013.01)
(Continued)

(52) U.S. Cl.
CPC ............ *G06F 3/14* (2013.01); *G02B 27/0172* (2013.01); *G06F 3/012* (2013.01); *G06F 3/017* (2013.01); *G06F 3/03547* (2013.01); *G06F 3/0488* (2013.01); *G06F 3/04817* (2013.01); *G06F 3/147* (2013.01); *G06F 3/167* (2013.01); *G09G 3/001* (2013.01); *G09G 5/14* (2013.01); *G09G 5/377* (2013.01); *G02B 2027/014* (2013.01);
(Continued)

(58) Field of Classification Search
CPC ...... G02B 2027/0138; G02B 2027/014; G02B 27/0172; G06F 3/012; G06F 3/017; G06F 3/03547; G06F 3/04817; G06F 3/0488; G06F 3/14; G06F 3/147; G06F 3/167; G09G 2340/12; G09G 2370/16; G09G 3/001

See application file for complete search history.

(56) References Cited

U.S. PATENT DOCUMENTS

2014/0361988 A1* 12/2014 Katz ....................... G06F 3/011
345/156

FOREIGN PATENT DOCUMENTS

WO         2014/128751        8/2014

* cited by examiner

*Primary Examiner* — Insa Sadio
(74) *Attorney, Agent, or Firm* — Greenblum & Bernstein, P.L.C.

(57) ABSTRACT

A head-mounted display apparatus worn on the head of a user includes an attitude detector that detects the attitude of the head-mounted display apparatus, a manipulation detector that detects a predetermined manipulation performed on the head-mounted display apparatus, a display, and a processor that switches first display information to be displayed on the display to second display information according to a change in the attitude detected by the attitude detector. If the manipulation detector detects the predetermined manipulation, even if there is a change in the attitude detected by the attitude detector, the processor maintains the first display information being displayed on the display without switching the second display information.

4 Claims, 15 Drawing Sheets

(51) Int. Cl.
*G06F 3/01* (2006.01)
*G02B 27/01* (2006.01)
*G06F 3/147* (2006.01)
*G09G 3/00* (2006.01)
*G09G 5/14* (2006.01)
*G09G 5/377* (2006.01)
*G06F 3/0354* (2013.01)

(52) U.S. Cl.
CPC . *G02B 2027/0138* (2013.01); *G09G 2340/12* (2013.01); *G09G 2370/16* (2013.01)

| ATTITUDE INFORMATION | TYPE OF DISPLAY INFORMATION |
|---|---|
| UPWARD | WEATHER |
| DOWNWARD | MAIL |
| LEFTWARD | TELEPHONE |
| RIGHTWARD | SEARCH |
| FRONTWARD | (NONE) |

HEAD-MOUNTED DISPLAY APPARATUS WORN ON USER'S HEAD

BACKGROUND

1. Technical Field

The present disclosure relates to a head-mounted display apparatus and a method of controlling it.

2. Description of the Related Art

A display apparatus is worn on the head of a user so that the user can view an image (this type of display apparatus will be referred to below as a head-mounted display apparatus). By using the head-mounted display apparatus, the user can view an image without using a hand or changing the direction of the field of view of the user. Therefore, the head-mounted display apparatus is very useful when, for example, a maintenance person services a machine while viewing an image that indicates a maintenance procedure.

International Publication No. WO 2014/128751 discloses a head-mounted display apparatus that presents information to a user as desired by the user according to the attitude of the head-mounted display apparatus. With the head-mounted display apparatus disclosed in International Publication No. WO 2014/128751, the user can automatically obtain desired information quickly with ease.

SUMMARY

With the technology disclosed in International Publication No. WO 2014/128751, however, the head-mounted display apparatus switches information to be presented to the user independently of the user's intention. Therefore, information to be displayed on the head-mounted display apparatus may be changed contrary to the user's intention.

One non-limiting and exemplary embodiment provides a head-mounted display apparatus and the like that appropriately present information to a user as desired by the user.

In one general aspect, the techniques disclosed here feature a head-mounted display apparatus worn on the head of a user; the head-mounted display apparatus includes an attitude sensor that detects an attitude of the head-mounted display apparatus, a manipulation sensor that detects a predetermined manipulation performed on the head-mounted display apparatus, a display that displays information, a processor, and a memory having a program stored therein, the program causing the processor to execute operations in which information to be displayed on the display is switched according to a change in the attitude detected by the attitude sensor, and when the manipulation sensor detects the predetermined manipulation, even if there is a change in the attitude detected by the attitude sensor, information being displayed on the display is maintained without being switched.

The head-mounted display apparatus in the present disclosure can appropriately present information to a user as desired by the user.

It should be noted that these comprehensive or specific aspects may be implemented as a system, a method, an integrated circuit, a computer program, a recording medium such as a computer-readable compact disc-read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
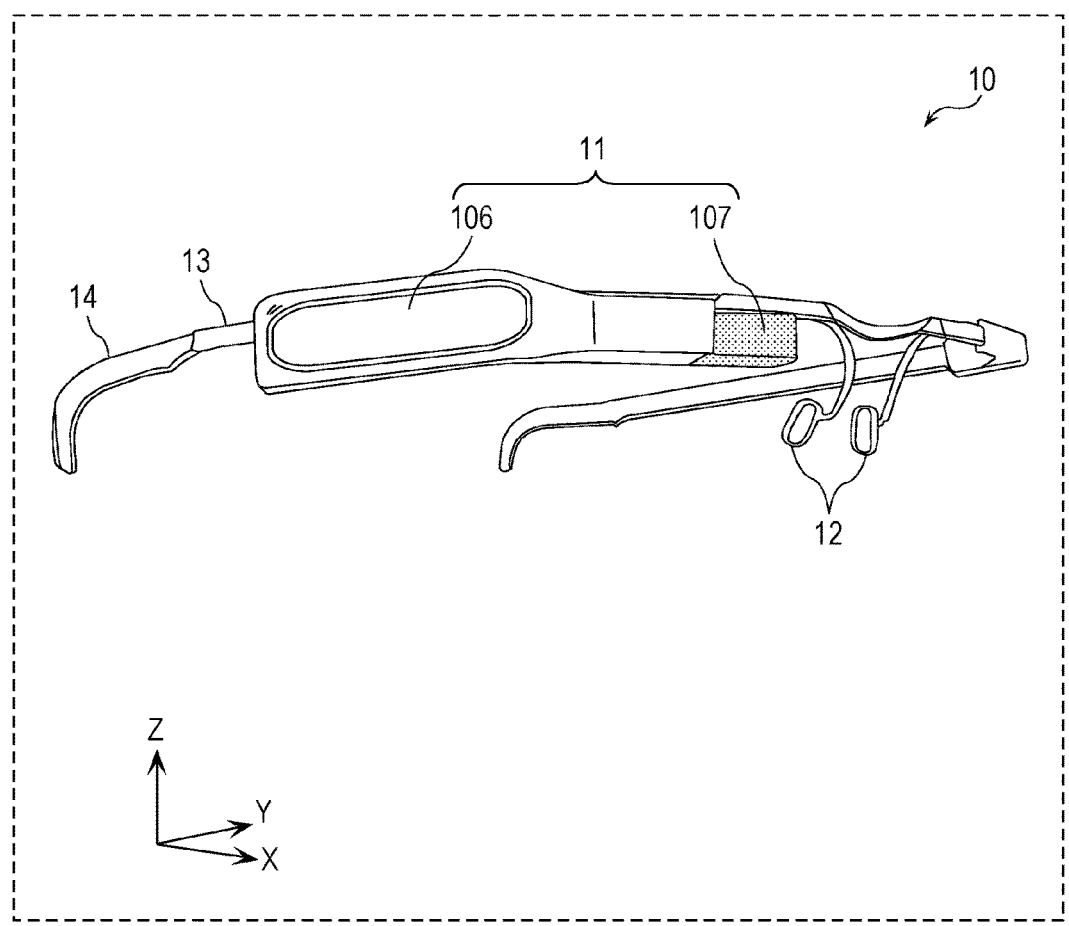
FIG. 1 illustrates an outside shape of a head-mounted display apparatus in a first embodiment.

Underlying Knowledge Forming Basis of the Present Disclosure

The inventor found that a problem with the head-mounted display apparatus described in Description of the Related Art arises as described below.

When a person looks up at the sky, the person often worries about the weather. If a head-mounted display apparatus displays a mark that indicates the today's weather when a user looks up at the sky, it may be possible to achieve an intuitive manipulation by the user. A conventional head-mounted display apparatus based on this idea switches information to be presented to a user according to a change in the attitude of the head-mounted display apparatus (see International Publication No. WO 2014/128751).

According to the technology disclosed in International Publication No. WO 2014/128751, when the attitude of the head-mounted display apparatus (direction in which the head-mounted display apparatus is inclined) is changed, information to be presented to the user changes. Therefore, if the information to be presented to the user is such that the user can grasp the information in a relatively short time (such as, for example, a single sunny mark indicating the weather of a day), the user can cause the head-mounted display apparatus to display the information by an intuitive motion to switch display information according to the attitude of the head-mounted display apparatus.

However, information to be presented to the user may be such that it takes a relatively long time for the user to grasp the information (such as, for example, a time trend of probability of rain). When this type of information is displayed in the method described above by switching the display in a similar manner according to a change in the attitude of the head-mounted display apparatus, if the attitude of the head-mounted display apparatus changes before the user completely grasps the information, the display is switched, in which case the user may be unable to grasp the information. That is, if the user wants to continue to view the information, the user needs to maintain the head-mounted display apparatus in a fixed attitude, lowering the convenience of the head-mounted display apparatus.

If information to be presented to the user changes contrary to the user's intention, the user needs to make another motion to restore the head-mounted display apparatus to the previous attitude. In addition, the head-mounted display apparatus needs to perform processing to switch information to be presented to the previous information according to the above user's motion.

In view of the above situation, the present disclosure provides a head-mounted display apparatus and the like that appropriately present information to a user as desired by the user without the head-mounted display apparatus having to be maintained in a fixed attitude.

To solve the above problem, the head-mounted display apparatus in one aspect of the present disclosure is a head-mounted display apparatus worn on the head of a user; the head-mounted display apparatus includes an attitude sensor that detects an attitude of the head-mounted display apparatus, a manipulation sensor that detects a predetermined manipulation performed on the head-mounted display apparatus, a display that displays information, a processor, and a memory having a program stored therein, the program causing the processor to execute operations in which information to be displayed on the display is switched according to a change in the attitude detected by the attitude sensor, and when the manipulation sensor detects the predetermined manipulation, even if there is a change in the attitude detected by the attitude sensor, information being displayed on the display is maintained without being switched.

Accordingly, when the user fixes (maintains) displayed information by performing a predetermined manipulation on the basis of the user's own decision, the head-mounted display apparatus can display necessary information regardless of the attitude of the head-mounted display apparatus. As described above, the head-mounted display apparatus can appropriately present information to a user as desired by the user.

An ordinary head-mounted display apparatus displays information only for a user wearing the head-mounted display apparatus. Therefore, it is said that a user who is wearing a head-mounted display apparatus and is performing a manipulation for the head-mounted display apparatus appears to be strange to persons in the vicinity of the user. If information can be displayed on the head-mounted display apparatus by the above motion, the user can display necessary information on the head-mounted display apparatus through a natural motion without making persons around the user feel uncomfortable.

As described above, the user not only can collect information through an intuitive natural motion without making persons around the user feel uncomfortable but also can grasp information that is such that it takes a relative long time for the user to grasp the information.

In the operations described above, for example, when the manipulation sensor detects the predetermined manipulation, if there is a change in the attitude detected by the attitude sensor, information being displayed on the display is maintained without being switched and the display form of the information is changed.

Accordingly, only by changing the display form of the information that is being displayed by the head-mounted display apparatus, the user can recognize at a glance that the displayed information is fixed regardless of a change in the attitude of the head-mounted display apparatus. This can prevent the user from mistakenly recognizing a situation in which the attitude of the head-mounted display apparatus has been changed but the display is not switched as a failure of the head-mounted display apparatus.

In the operations described above, for example, when the information is displayed on the display, a figure is displayed as the background of the information together with the information, and the display form of the information is changed by changing the color of the figure.

In the operations described above, for example, when the information is displayed on the display, a frame that encloses the information is displayed together with the information, and the display form of the information is changed by changing the thickness or color of the frame.

Accordingly, by changing the color of the background or frame that is being displayed by the head-mounted display apparatus, the user can specifically recognize that a display given by the head-mounted display apparatus is fixed.

In the operations described above, for example, it is decided whether the amount of information to be displayed on the display is larger than a predetermined value. Only if the amount of information is decided to be larger than the predetermined value, when the manipulation sensor detects the predetermined manipulation, the information being displayed on the display is maintained without being switched even if there is a change in the attitude detected by the attitude sensor.

In the operations described above, for example, it is decided whether the amount of information to be displayed on the display is smaller than the predetermined value. If the amount of information is decided to be smaller than the predetermined value, information to be displayed on the display is switched according to a change in the attitude detected by the attitude sensor even if the manipulation sensor detects the predetermined manipulation.

Accordingly, according to the feature of the information being displayed, the head-mounted display apparatus decides whether a display of the information is maintained or switched according to the attitude of the head-mounted display apparatus. Specifically, it is possible to infer to a certain extent whether the information is such that the user wants to switch the display of the information according to the attitude of the head-mounted display apparatus (that is, the information is such that the user can grasp the information in a relatively short time) or the information is such that the user does not want to switch the display of the information (that is, the information is such that it takes a relatively long time for the user to grasp the information). For each piece of information, therefore, the head-mounted display apparatus can set in advance which of the above two types the information is.

Thus, even if the user performs a predetermined manipulation by mistake in a state in which information that the user can grasp in a relatively short time (such as, for example, a single sunny mark indicating the weather of a day) is displayed, it is possible to switch information to be displayed according to the attitude of the head-mounted display apparatus.

In the operations described above, for example, if the manipulation sensor detects the predetermined manipulation and further detects a subsequent manipulation that is the same as the predetermined manipulation, information to be displayed on the display is switched according to the attitude detected by the attitude sensor when the manipulation sensor has detected the subsequent manipulation.

Accordingly, when the head-mounted display apparatus terminates the state in which a display is fixed, the head-mounted display apparatus can display appropriate information according to the attitude of the head-mounted display apparatus without the user having to perform some manipulation. This reduces a load on the user when the user views next information.

In the operations described above, for example, if the manipulation sensor detects the predetermined manipulation and further detects a subsequent manipulation that is the same as the predetermined manipulation, the displaying of information on the display is stopped.

Accordingly, when the head-mounted display apparatus terminates a state in which a display is fixed, the head-mounted display apparatus deletes the display to prevent the user from displaying information that the user does not need. This reduces annoyance that the user feels when unnecessary information is displayed.

For example, the manipulation sensor has a manipulation button; the manipulation sensor detects, as the predetermined manipulation, the pressing of the button or a touch to it.

For example, the manipulation sensor has a touchpad; the manipulation sensor detects a tap on the touchpad as the predetermined manipulation.

For example, the manipulation sensor has a microphone and a voice recognizing apparatus that acquires a speech of the user through voice recognition of voice collected by the microphone; the manipulation sensor detects, as the predetermined manipulation, the acquisition of a predetermined speech by the voice recognizing apparatus.

Accordingly, when the user presses the manipulation button, taps the touchpad, or makes a voice input, the head-mounted display apparatus can specifically accept a manipulation from the user.

For example, the attitude sensor creates attitude information, which indicates a direction to which the attitude has been changed from a reference attitude, the direction being one of an upward direction, a downward direction, a leftward direction, and a rightward direction when viewed from the user. In the operations described above: four information items associated with the upward, downward, leftward, and rightward directions are stored in the memory as information to be displayed on the display; icons are displayed at portions, on the display area of the display, in the upward, downward, leftward, and rightward directions, each icon indicating one of the four information items that is associated with the upward direction, downward direction, leftward direction, or rightward direction, whichever is applicable; and when the attitude sensor creates the attitude information, information associated with the direction indicated by the created attitude information is displayed on the display.

Accordingly, since the head-mounted display apparatus displays an icon, the user can recognize both a direction in which the head-mounted display apparatus is inclined and information assigned to the direction. This eliminates the need for the user to remember that what information is assigned to what direction in which the head-mounted display apparatus is inclined, reducing a burden on the user.

For example, the head-mounted display apparatus further has a gesture sensor that detects a swipe gesture manipulation that indicates one direction, the swipe gesture manipulation being performed in a manipulation space. In the operations described above, information to be displayed by the display is switched according to the direction indicated by the swipe gesture manipulation.

Accordingly, the user can switch display information through a swipe manipulation instead of changing the attitude of the head-mounted display apparatus. Therefore, for example, while facing the front, the user can cause the head-mounted display apparatus to display necessary information through a swipe manipulation and can grasp the information and can grasp the information; the necessary information would otherwise be displayed by changing the attitude of the head-mounted display apparatus. At that time, the user does not need to change the attitude of the head-mounted display apparatus. It is possible to increase choices of user's manipulations to check information that is such that it takes a relative long time for the user to grasp the information.

A head-mounted display apparatus in one aspect of the present disclosure is a head-mounted display apparatus worn on the head of a user; the head-mounted display apparatus includes an attitude sensor that detects an attitude of the head-mounted display apparatus, a gesture sensor that detects a swipe gesture manipulation that indicates one direction, the swipe gesture manipulation being performed in a manipulation space, a display that displays information, a processor, and a memory having a program stored therein, the program causing the processor to execute operations in which information to be displayed on the display is switched according to a change in the attitude detected by the attitude sensor, and information to be displayed on the display is switched according to the direction indicated by the swipe gesture manipulation detected by the gesture sensor.

Accordingly, the user can switch display information by performing a swipe manipulation instead of changing the attitude of the head-mounted display apparatus. Therefore, for example, while facing the front, the user can cause the head-mounted display apparatus to display necessary information through a swipe manipulation and can grasp the information; the necessary information would otherwise be displayed by changing the attitude of the head-mounted display apparatus. As described above, the head-mounted display apparatus can appropriately present information to a user as desired by the user.

As described above, the user not only can collect information through an intuitive natural motion without making persons around the user feel uncomfortable but also can grasp information that is such that it takes a relative long time for the user to grasp the information.

For example, the gesture sensor detects a motion of a hand of the user from above to down as a swipe gesture manipulation indicating the downward direction, detects a motion of the hand of the user from down to above as a swipe gesture manipulation indicating the upward direction, detects a motion of the hand of the user from left to right as a swipe gesture manipulation indicating the rightward direction, and detects a motion of the hand of the user from right to left as a swipe gesture manipulation indicating the leftward direction. In the operations described above, information to be displayed on the display is switched according to the direction indicated by the swipe gesture manipulation detected by the gesture sensor.

Accordingly, the head-mounted display apparatus can accept a gesture manipulation performed by the user as a manipulation that indicates one of the four directions, which are the upward, downward, leftward, and rightward directions, and can display information corresponding to the accepted direction. Since the number of directions and the number of information items are reduced in this way, a manipulation by a rough gesture can be accepted without requiring the user to perform a strict manipulation, so manipulability can be improved.

For example, the attitude sensor creates attitude information, which indicates a direction to which the attitude has been changed from a reference attitude, the direction being one of the upward, downward, leftward, and rightward directions when viewed from the user. In the operations described above: four information items associated with the upward, downward, leftward, and rightward directions are stored in the memory as information to be displayed on the display; icons are displayed at portions, on the display area of the display, in the upward, downward, leftward, and rightward directions, each icon indicating one of the four information items that is associated with the upward direction, downward direction, leftward direction, or rightward direction, whichever is applicable; and when the gesture sensor detects the swipe gesture manipulation, information associated with the direction indicating the start point of the swipe gesture manipulation is displayed on the display.

Accordingly, since the head-mounted display apparatus displays an icon, the user can recognize both the direction of a gesture manipulation and information assigned to the direction. This eliminates the need for the user to remember that what information is assigned to what direction of a gesture manipulation, reducing a burden on the user.

For example, the gesture sensor has a camera that captures images of a hand of the user with visible light; the gesture sensor detects the swipe gesture manipulation according to the motion of the hand of the user, the images of the hand having been captured by the camera.

For example, the gesture sensor has an infrared sensor that detects infrared rays released from a hand of the user; the gesture sensor detects the swipe gesture manipulation according to the motion of the hand of the user, the motion having been acquired by the infrared sensor.

Accordingly, the head-mounted display apparatus can acquire a motion of a hand of the user with a visible camera or an infrared camera and can specifically accept a gesture manipulation according to the motion.

For example, the head-mounted display apparatus further has a manipulation sensor that detects a predetermined manipulation performed on the head-mounted display apparatus; when the manipulation sensor detects the predetermined manipulation performed by the user, even if there is a change in the attitude detected by the attitude sensor, information being displayed on the display is maintained without being switched.

Accordingly, when the user fixes (maintains) displayed information by performing a predetermined manipulation on the basis of the user's own decision, the head-mounted display apparatus can display necessary information regardless of the attitude of the head-mounted display apparatus.

As described above, the user not only can collect information through an intuitive natural motion without making persons around the user feel uncomfortable but also can grasp information that is such that it takes a relative long time for the user to grasp the information.

A head-mounted display apparatus control method in one aspect of the present disclosure is a method of controlling a head-mounted display apparatus worn on the head of a user, the head-mounted display apparatus having a display that displays information. The head-mounted display apparatus control method includes: an attitude detection step of detecting an attitude of the head-mounted display apparatus by using an attitude sensor; a manipulation detection step of detecting a predetermined manipulation performed on the head-mounted display apparatus by using a manipulation sensor; and a control step of causing a processor to switch information to be displayed on the display according to a change in the attitude detected in the attitude detection step. In the control step, when the predetermined manipulation is detected in the manipulation detection step, even if there is a change in the attitude detected in the attitude detection step, information being displayed on the display is maintained without being switched.

Thus, the same effect as with the head-mounted display apparatus described above can be obtained.

A head-mounted display apparatus control method in one aspect of the present disclosure is a method of controlling a head-mounted display apparatus worn on the head of a user, the head-mounted display apparatus having a display that displays information. The head-mounted display apparatus control method includes: an attitude detection step of detecting an attitude of the head-mounted display apparatus by using an attitude sensor; a gesture detection step of detecting a swipe gesture manipulation that indicates one direction by using a gesture sensor, the swipe gesture manipulation being performed in a manipulation space; and a control step of causing a processor to switch information to be displayed on the display according to a change in the attitude detected in the attitude detection step. In the control step, information to be displayed on the display is switched according to the direction indicated by the swipe gesture manipulation detected by the gesture sensor.

Thus, the same effect as with the head-mounted display apparatus described above can be obtained.

A head-mounted display apparatus according to an embodiment of the present disclosure will be described below with reference to the drawings.

It should be noted that these comprehensive or specific aspects may be implemented as a system, a method, an integrated circuit, a computer program, a recording medium such as a computer-readable compact disc-read-only memory (CD-ROM), or any selective combination thereof.

Embodiments will be described below with reference to the drawings.

All embodiments described below illustrate comprehensive or specific examples. Numerals, shapes, materials, constituent elements, the placement positions and connection forms of these constituent elements, steps, the sequence of these steps, and the like are only examples, and are not intended to restrict the present disclosure. Of the constituent elements described in the embodiments below, constituent elements not described in independent claims, each of which indicates the topmost concept, will be described as optional constituent elements.

First Embodiment

In this embodiment, a head-mounted display apparatus and the like that appropriately present information to a user as desired by the user will be described. More specifically, a head-mounted display apparatus and the like will be described that continue to display information that is such that it takes a relative long time for the user to grasp the information according to the user's manipulation.

FIG. 1 illustrates an outside shape of a head-mounted display apparatus 10 in the first embodiment.

The head-mounted display apparatus 10 is an eyeglass-type terminal that is worn on the head of a user as illustrated in FIG. 1. The head-mounted display apparatus 10 has a main body 11, nose pads 12, temples 13, and earpieces 14.

The main body 11 is a processor that causes the head-mounted display apparatus 10 to perform information processing, display an image, and perform other processing. The main body 11 is attached to part of the temples 13. When the position or attitude of the user's head is changed, the position or attitude of the main body 11 is changed together with the user's head. The functions of the main body 11 and processing by it will be described later in detail.

The nose pads 12 fix the head-mounted display apparatus 10 to the user's head. To fix the head-mounted display apparatus 10 to the user's head, the nose pads 12 are placed so as to sandwich the user's nose from both the right side and the left side.

Each temple 13 is a rod that links the relevant nose pad 12 and earpiece 14 together.

The earpieces 14 fix the head-mounted display apparatus 10 to the user's head. To fix the head-mounted display apparatus 10 to the user's head, the earpieces 14 are placed so as to rest on the user's ears.

The depth direction when viewed by the user wearing the head-mounted display apparatus 10 will also be referred to as the X direction, the left and right direction will also be referred to as the Y direction, and the direction in which the top of the head and feet are mutually linked will also be referred to as the Z direction. Unless otherwise noted, the positive direction of the Z direction will be referred to as the upward direction and its negative direction will be referred to as the downward direction.

The shape of the head-mounted display apparatus 10 illustrated in FIG. 1 is just an example. If the head-mounted display apparatus 10 is worn on at least part of the user's head and displays an image to be presented to the user, the head-mounted display apparatus 10 may have any shape. For example, the head-mounted display apparatus 10 may be of a cap type or a helmet type.

Figure 2:
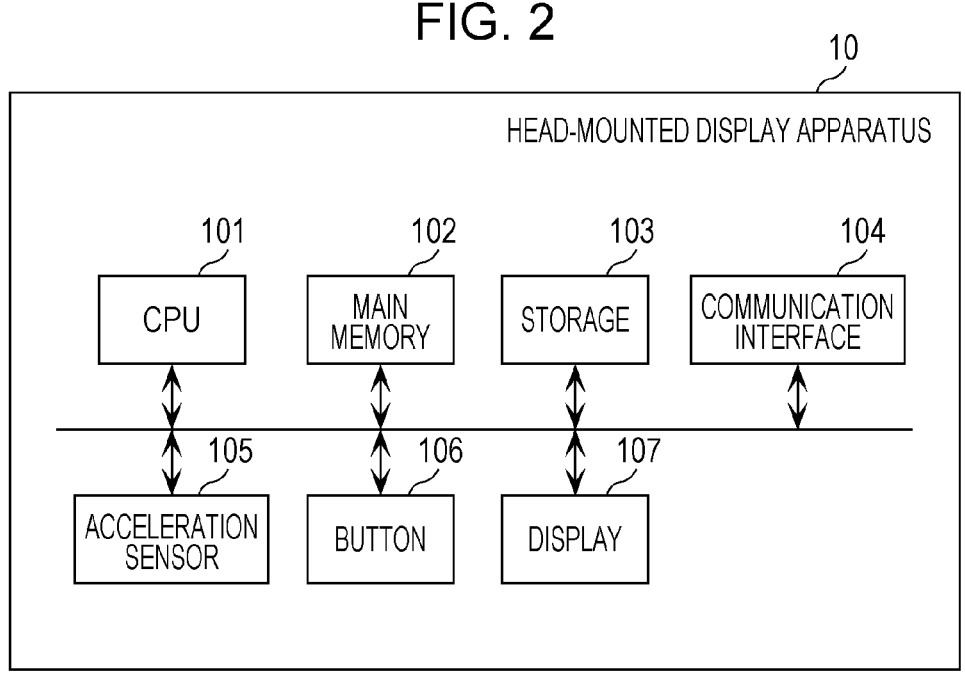
FIG. 2 is a block diagram illustrating the hardware structure of the head-mounted display apparatus in the first embodiment.

FIG. 2 is a block diagram illustrating the hardware structure of the head-mounted display apparatus 10 in this embodiment.

As a hardware structure, the head-mounted display apparatus 10 has a central processing unit (CPU) 101, a main memory 102, a storage 103, a communication interface 104, an acceleration sensor 105, a button 106, and a display 107, as illustrated in FIG. 2.

The CPU 101 a processor that executes a control program stored in the storage 103 or the like.

The main memory 102 is a volatile storage area used by the CPU 101 as a work area when the CPU 101 executes the control program.

The storage 103 is a non-volatile storage area that retains the control program and content.

The communication interface 104 is a network interface that transmits data to and receives data from another apparatus through a network. The communication interface 104 is, for example, a wireless local area network (LAN) interface conforming to the IEEE802.11a/b/g standard.

The acceleration sensor 105 is a sensor that detects acceleration.

The button 106 (also referred to as the manipulation button) is an input device that accepts a manipulation performed by the user such as pressing or a touch. A touchpad (not illustrated) can also be used instead of the button 106. In addition, the button 106 can be replaced with a combination of a microphone (not illustrated) that collects surrounding voice and a voice recognizing apparatus (not illustrated) that acquires a speech of the user through voice recognition of the voice collected by the microphone. In this case, the acquisition of a certain speech by the voice recognizing apparatus is accepted as the above manipulation.

The display 107 is a transparent display device that displays an image. The display 107 is, for example, a prism display that presents an image to the user by using a half mirror. As long as the display 107 presents an image to the user, the type of the display 107 is not important. The display 107 may be, for example, a so-called retinal scanning display that uses laser beams to present an image to the retinas of the user.

Figure 3:
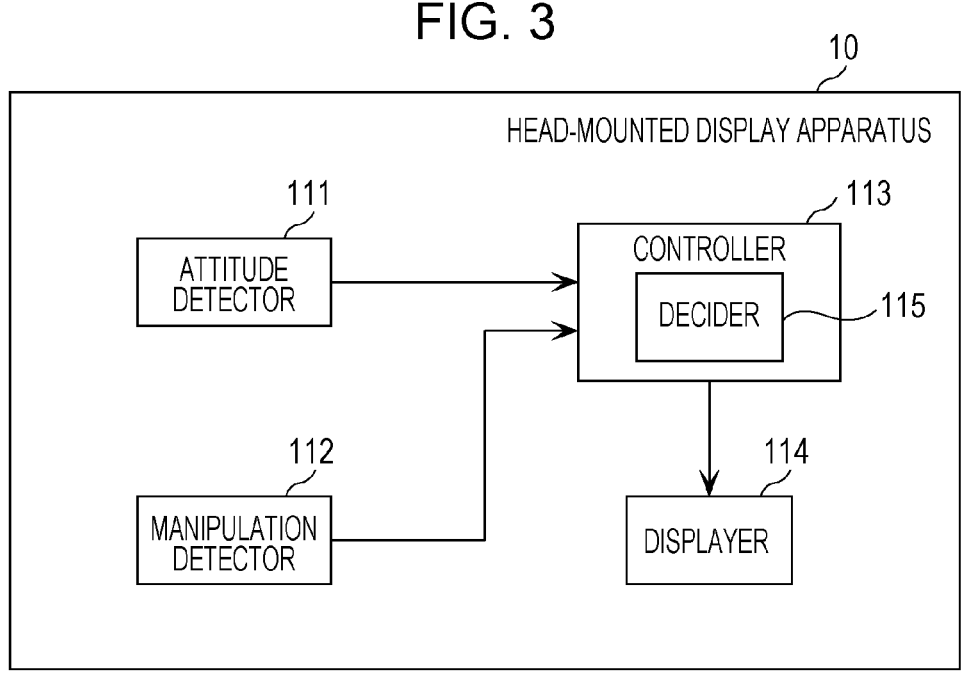
FIG. 3 is a block diagram illustrating the functional structure of the head-mounted display apparatus in the first embodiment.

FIG. 3 is a block diagram illustrating the functional structure of the head-mounted display apparatus 10 in this embodiment.

As a functional structure, the head-mounted display apparatus 10 has an attitude detector 111, a manipulation detector 112, a controller 113, and a displayer 114 as illustrated in FIG. 3. The controller 113 may have a decider 115 as its one function.

The attitude detector 111 is a processor that detects an attitude of the head-mounted display apparatus 10. Specifically, the attitude detector 111 causes the acceleration sensor 105 to detect an attitude of the head-mounted display apparatus 10 and a change in the attitude and creates attitude information, which indicates the change in the attitude. The attitude of the head-mounted display apparatus 10 has a one-to-one correspondence with the orientation of the user's head. If, for example, the user's head is in the front-upward attitude at an angle, the attitude detector 111 creates attitude information indicating "upward inclination" (simply referred to below as "upward"). The attitude detector 111 is implemented by the CPU 101, the main memory 102, the storage 103, the acceleration sensor 105, and the like.

A change in the attitude of the head-mounted display apparatus 10 is caused by either of a change in the orientation of the whole of the user's body and a change in the motion of the user's neck. These changes are identified by the value of acceleration detected by the acceleration sensor 105. Specifically, if the value of acceleration detected by the acceleration sensor 105 is equal to or larger than a predetermined value, the change is identified as having been caused by the motion of the neck. The attitude detector 111 may create information indicating the above attitude only when the attitude detector 111 detects a change in the attitude caused by the motion of the user's neck. This is because a change in the attitude caused by the motion of the user's neck is considered to more clearly indicate that the user has intentionally changed the attitude of the head.

The attitude detector 111 may detect five directions, which are upward, downward, leftward, rightward, and frontward directions, as attitudes. The user's head orientation intended by the user may not exactly match the actual user's head orientation. For example, even if the user intends to move the user's head upward, the actual user's head orientation may not be in the accurate upward direction; the user's head may be oriented in a direction that is slightly inclined to the left (or right) with respect to the upward direction. In view of this, when the attitude detector 111 is structured so that it detects the above five directions as attitudes, it is possible to determine a direction, as described above, that is slightly deviated from the accurate upward direction as the upward direction. When not only the exact upward direction but also a direction within a predetermined range including the exact upward direction are determined as the upward direction, flexible manipulations by the user are accepted.

The manipulation detector 112 is a processor that detects a manipulation performed on the head-mounted display apparatus 10 by the user. The manipulation detector 112 detects the pressing of the button 106 by the user or a touch to it by the user. The manipulation detector 112 is implemented by the CPU 101, the main memory 102, the storage 103, the button 106, and the like.

The controller 113 is a processor that switches information to be displayed by the displayer 114 according to a change, detected by the attitude detector 111, in the attitude of the head-mounted display apparatus 10 (the information will also be referred to below as the display information). In addition, when the manipulation detector 112 detects a manipulation, even if there is a change, detected by the attitude detector 111, in the attitude of the head-mounted display apparatus 10, the controller 113 maintains the display information to be displayed by the displayer 114 without switching the display information.

Specifically, the controller 113 causes the displayer 114 to display various types of display information. More specifically, the controller 113 holds a correspondence in advance between each of the attitudes of the head-mounted display apparatus 10 and display information to be displayed by the displayer 114 as commanded by the controller 113 when the head-mounted display apparatus 10 is in the attitude. The controller 113 acquires attitude information from the attitude detector 111, selects display information associated with the acquired attitude information, and causes the displayer 114 to display the selected display information. The display information may be information that is obtained when the controller 113 executes a predetermined application to output the display information. Alternatively, the display information may be predetermined information or may be information obtained from the outside through the communication interface 104.

The controller 113 displays icons at portions, on the display area of the displayer 114, in the upward, downward, leftward, and rightward directions, each icon indicating one of the four information items that is associated with the direction. These icons help the user know that what information is displayed by inclining the head-mounted display apparatus 10 in what direction.

When maintaining the display information, the controller 113 may maintain the type of the display information. Specifically, the controller 113 may maintain the type of the display information and may handle the display information itself so that it is switched within the range of the type.

The controller 113 may change the display form of display information to be presented to the user when the manipulation detector 112 detects a manipulation to notify the user that display information is being maintained by the displayer 114. Specifically, the controller 113 may change the display form of display information so that it is highlighted. Accordingly, it is possible to have the user explicitly recognize that even if the attitude of the head-mounted display apparatus 10 is changed, the display information is maintained without being switched.

As described above, the controller 113 may have the decider 115. In this case, the controller 113 switches or maintains information to be displayed on the displayer 114 according not only to the attitude of the head-mounted display apparatus 10 but also to the result of a decision made by the decider 115 about display information.

The decider 115 is a processor that decides whether the amount of information to be displayed by the displayer 114 is larger than or smaller than a predetermined value. The amount of information is an amount decided according to a display area occupied by information to be displayed by the displayer 114, the number of characters, and the presence or absence of a mixture of images and characters. Information is decided to have a large amount of information when, for example, the information occupies a display area larger than the predetermined value, the information occupies a display area the ratio of which to the displayable area of the display 107 is larger than a predetermined value, the information includes more characters or images than a predetermined value, or the information includes both images and characters. Since it is possible to infer to a certain extent whether the user intends to switch the display information according to this amount of information, the controller 113 can decide whether to switch or maintain the display information according to the result of the above decision. The decider 115 is equivalent to a first decider or a second decider in WHAT IS CLAIMED IS.

The displayer 114 is a display device that displays information as an image. Specifically, the displayer 114 displays display information selected by the controller 113 as an image. The displayer 114 is implemented by the display 107 and the like.

The functions of the functional blocks of the head-mounted display apparatus 10 and processing by these functional blocks will be described below in detail. First, how the attitude detector 111 detects the attitude of the head-mounted display apparatus 10 will be described.

Figure 4:
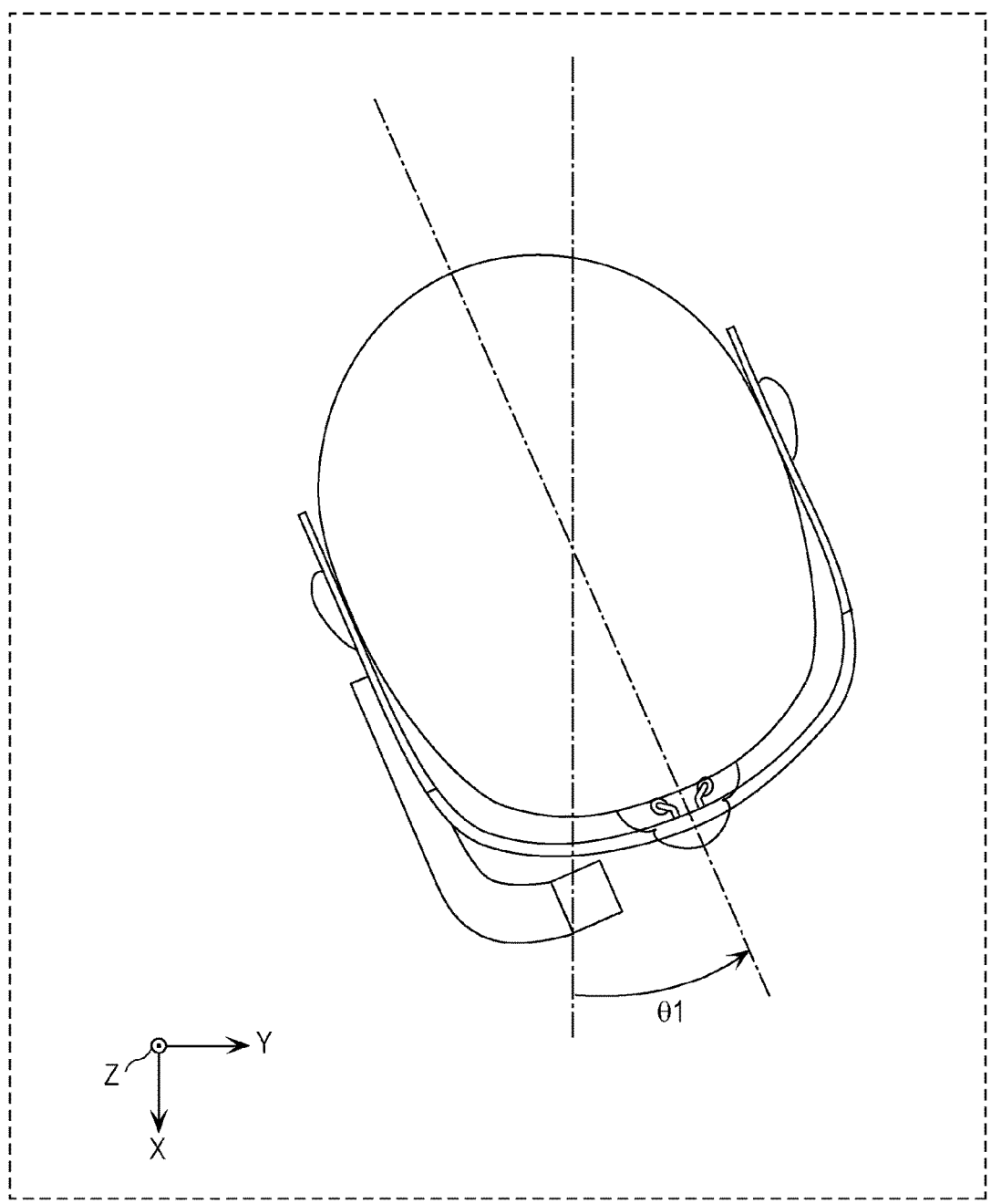
FIG. 4 illustrates how an attitude detector in the first embodiment detects an attitude.

FIG. 4 illustrates how the attitude detector 111 in this embodiment detects an attitude. FIG. 4 illustrates a change in the attitude of the head-mounted display apparatus 10 when the user shakes the neck in a horizontal plane (XY plane), that is, when the user rotates the head horizontally (to the left or right).

Specifically, FIG. 4 illustrates a case in which the user rotates the head so the head is oriented to a direction inclined through θ1 degrees to the left with respect to the direction in which the user views the front. At that time, the attitude detector 111 detects from the acceleration sensor 105 that the head-mounted display apparatus 10 has changed from the reference attitude to an attitude rotated through θ1 degrees to the left with respect to the reference attitude. The reference attitude is an attitude at a time when this attitudes starts to change, that is, the reference attitude is an attitude in a case in which the user's head is thought to be substantially stationary.

Figure 5:
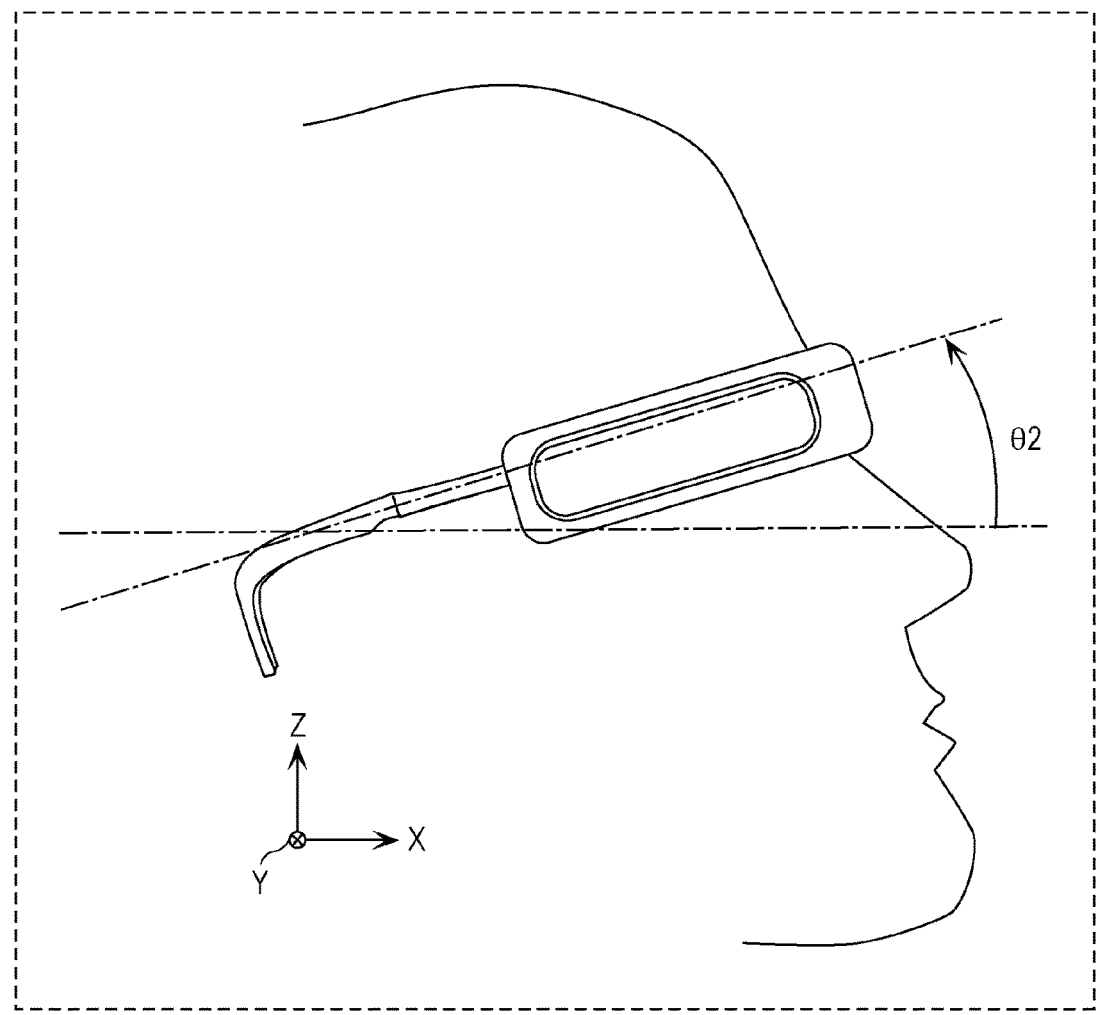
FIG. 5 also illustrates how the attitude detector in the first embodiment detects an attitude.

FIG. 5 also illustrates how the attitude detector 111 in this embodiment detects an attitude. FIG. 5 illustrates a change in the attitude of the head-mounted display apparatus 10 when the user shakes the neck in the vertical direction (in an XZ plane), that is, when the user shakes the head vertically (upward or downward).

Specifically, FIG. 5 illustrates a case in which the user shakes the head so the head is oriented to a direction inclined through θ2 degrees upward with respect to the direction in which the user views the front. At that time, the attitude detector 111 detects from the acceleration sensor 105 that the head-mounted display apparatus 10 has changed from the reference attitude to an attitude inclined through θ2 degrees upward with respect to the reference attitude.

The attitude detector 111 detects the attitude of the head-mounted display apparatus 10 according to θ1 and θ2 obtained as described above. The attitude of the head-mounted display apparatus 10 may be identified as one of an unlimited number of steps through a combination of θ1 and θ2. Alternatively, the attitude may be identified as a rough attitude such as, for example, an upward attitude or downward attitude by dividing the range of θ1 and θ2 into a predetermined number of segments. In the description below, the latter case will be described; specifically, a case will be described in which the attitude of the head-mounted display apparatus 10 is identified, according to θ1 and θ2, as one of five attitudes, which are an upward attitude, a downward attitude, a leftward attitude, a rightward attitude, and a frontward attitude.

Figures 6, 7:
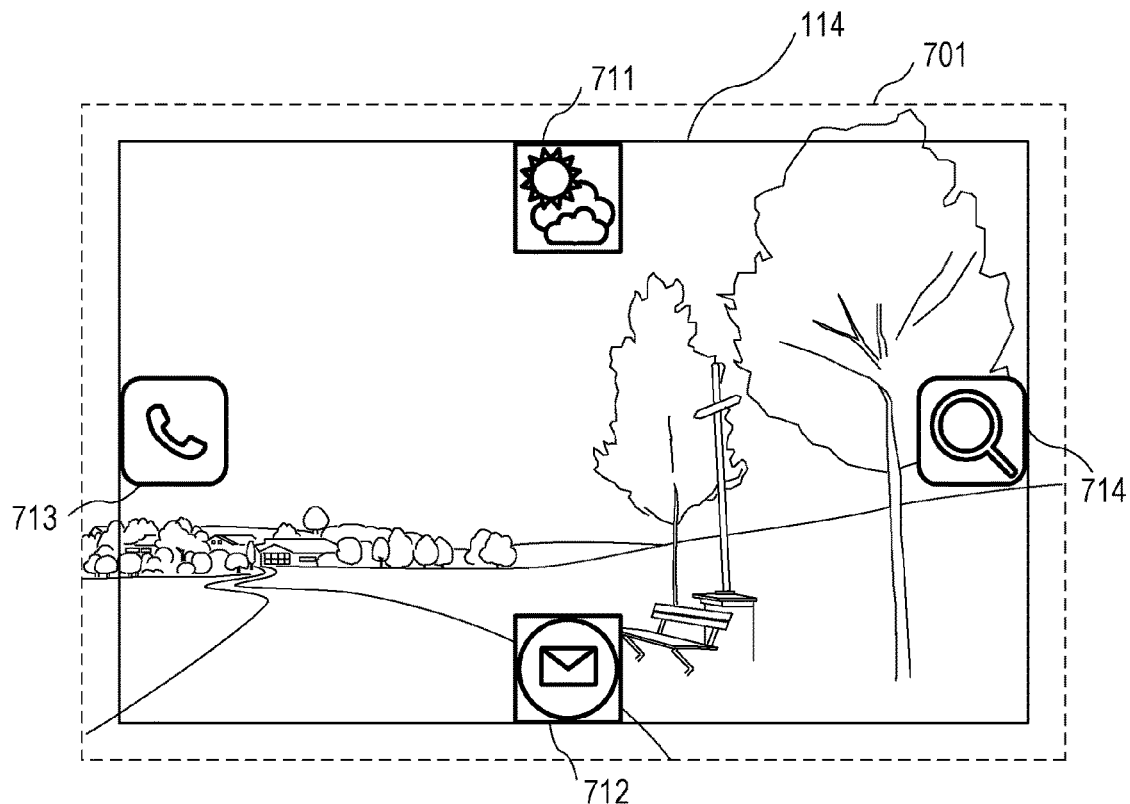
FIG. 6 illustrates a table, in the first embodiment, that indicates attitude information and types of display information displayed by a controller in correspondence to each other.
FIG. 7 illustrates, in the first embodiment, the field of view of the user and icons displayed on a displayer.

FIG. 6 illustrates a table 601, in this embodiment, that indicates attitude information the controller 113 and types of display information displayed by the controller 113 in correspondence to each other. Specifically, the table 601 indicates correspondence between each attitude of the head-mounted display apparatus 10 and a type of display information to be displayed by the controller 113 on the displayer 114 when the attitude is taken.

For example, the upward attitude of the head-mounted display apparatus 10 is associated with "weather forecast" which is one type of the display information. That is, if the attitude detector 111 detects that the attribute of the head-mounted display apparatus 10 is the upward attitude, the controller 113 displays information about the weather forecast on the displayer 114. To display information about a weather forecast on the displayer 114, the controller 113 may obtain in advance necessary information from the outside through the communication interface 104 or the like by using a predetermined application or the like and may create display information by performing information processing on the obtained information.

The front attitude of the head-mounted display apparatus 10 is associated with an indication that there is no relevant display information. This means that when the user faces the front, there is no display information, that is, the displayer 114 displays no information.

Display information that the displayer 114 displays will be described below.

FIG. 7 illustrates, in this embodiment, the field of view 701 of the user and icons displayed on the displayer 114.

The field of view 701 of the user indicates an extent viewable to the user wearing the head-mounted display apparatus 10. The field of view 701 of the user includes an external landscape and also includes the displayer 114 so that it is superimposed on the external landscape. That is, the user views the external landscape through the displayer 114. The icons 711, 712, 713, and 714 are displayed at portions, on the display area of the displayer 114, that indicate the upward, downward, leftward, and rightward directions, respectively. These icons present to the user an attitude of the head-mounted display apparatus 10 (a direction in which the head-mounted display apparatus 10 is inclined) and a type of display information in the attitude. These icons help the user know that when the user changes the attitude of the head-mounted display apparatus 10 to the direction indicated by an icon, the display information indicated by the icon is displayed.

As described above, the user uses the head-mounted display apparatus 10 to visually recognize an external landscape and information superimposed on the external landscape.

Figure 8:
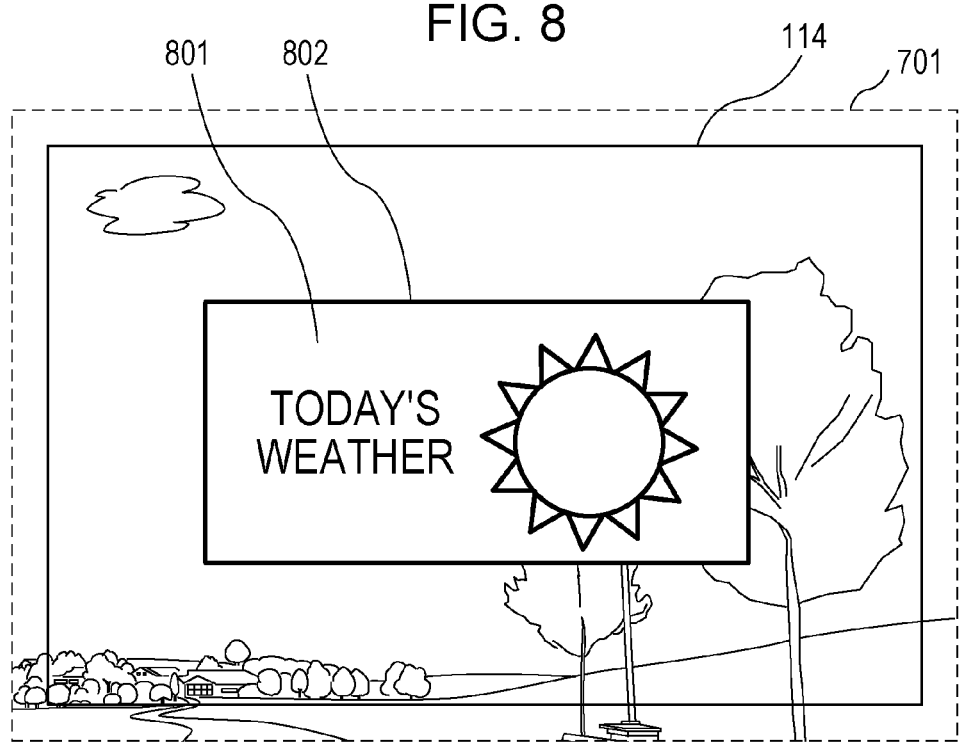
FIG. 8 illustrates, in the first embodiment, the field of view of the user and an image displayed on the displayer.

FIG. 8 illustrates, in this embodiment, the field of view of the user and an image 801 displayed on the displayer 114. The image 801 is an example of an image displayed by the displayer 114 according to a change in the attitude of the head-mounted display apparatus 10 as commanded by the controller 113.

The image 801 indicates a weather forecast image, which is information displayed when the attitude of the head-mounted display apparatus 10 is in the upward direction. The image 801, which is enclosed by a frame 802, includes text and a figure that indicate the weather of the day.

In this case, like the image 801, a white color may be displayed on a portion that becomes the background of the information indicating the forecasted weather. Alternatively, nothing may be displayed so that the user can visually recognize the external landscape through the displayer 114.

Figure 9:
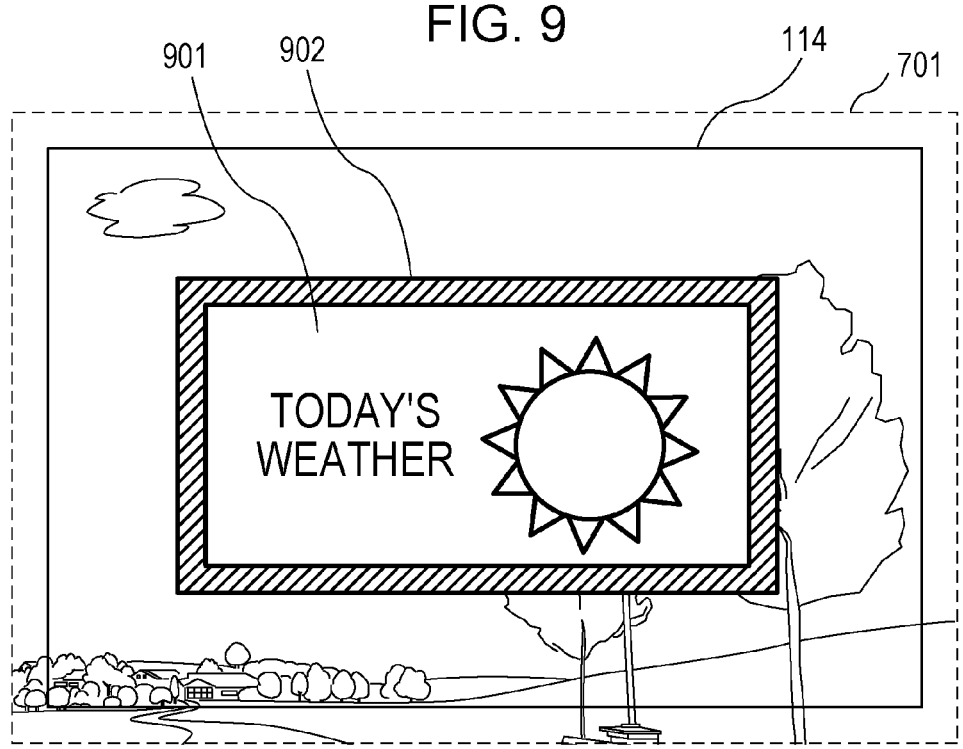
FIG. 9 illustrates a highlighted display form in the first embodiment.

FIG. 9 illustrates a highlighted display form in this embodiment. An image 901 is an example of a display image on which the controller 113 has changed the display form in response to a predetermined manipulation performed by the user.

Specifically, on the image 901, the frame 902 of the image has been changed so as to be thicker than on the image 801. Thus, the head-mounted display apparatus 10 enables the user to aggressively recognize that the display information is being maintained on the displayer 114, that is, the display is not switched even in a case in which the attitude is changed.

To indicate that the display information is being maintained on the displayer 114, the image may be highlighted in any other method instead of changing the frame of the image to a thick frame. Specifically, the color of a figure used as the background of the image may be changed, the color or ornament (such as a font, a bold style, an italic style, or underlines) of text may be changed, or a plurality of methods described above may be combined.

Processing to change information to be displayed by the 114 as commanded by the controller 113 will be described below.

Figure 10:
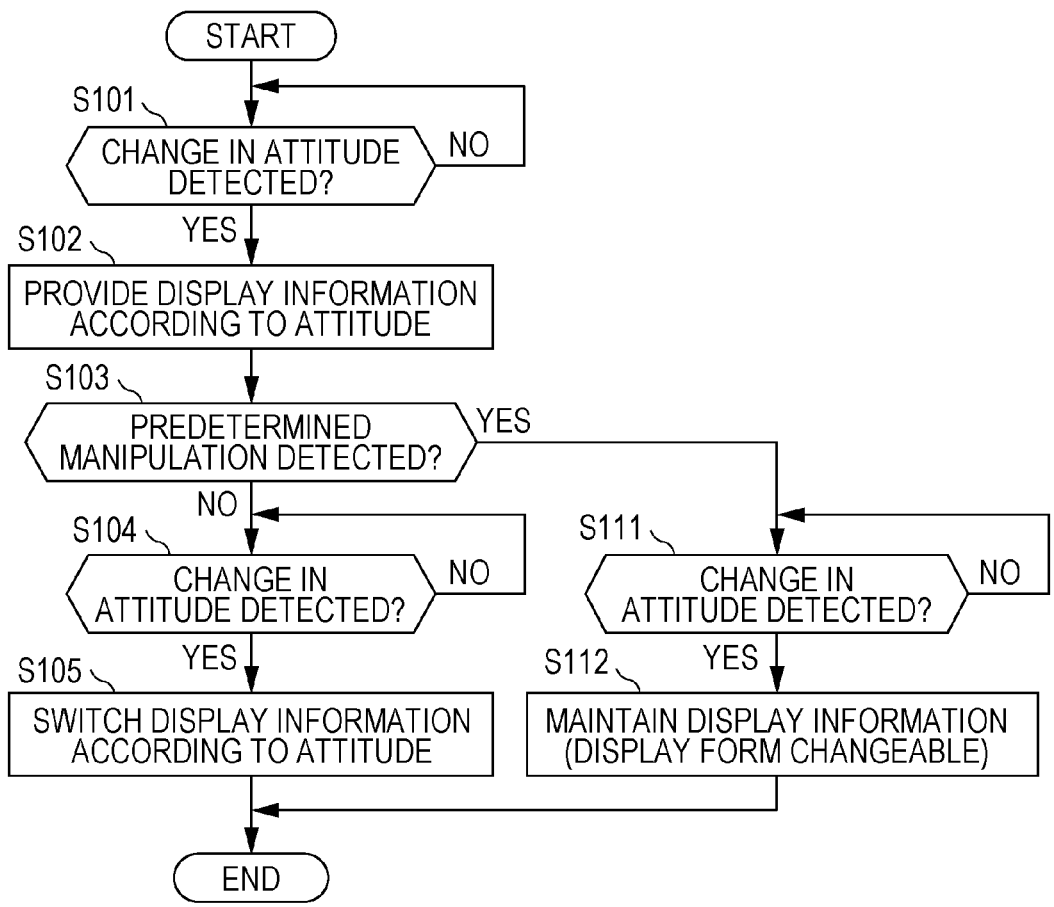
FIG. 10 is a flowchart of processing performed by the controller in the first embodiment to switch or maintain display information.

FIG. 10 is a flowchart of processing performed by the controller 113 in this embodiment to switch or maintain display information. FIGS. 12A, 12B, 12C, 12D and 12E schematically illustrates a series of flow in which the controller 113 in this embodiment maintains a display and terminates the maintaining of the display.

In step S101, it is decided whether the attitude detector 111 has detected a change in the attitude of the head-mounted display apparatus 10. If the attitude detector 111 has detected a change in the attitude (the result in step S101 is Yes), the attitude detector 111 creates attitude information indicating the detected change in the attitude, after which the sequence proceeds to step S102. If the attitude detector 111 has not detected a change in the attitude (the result in step S101 is No), step S101 is executed again. That is, the attitude detector 111 is placed on standby in step S101 until it detects a change in the attitude. Step S101 is equivalent to the state in FIG. 12A.

Figure 12A:
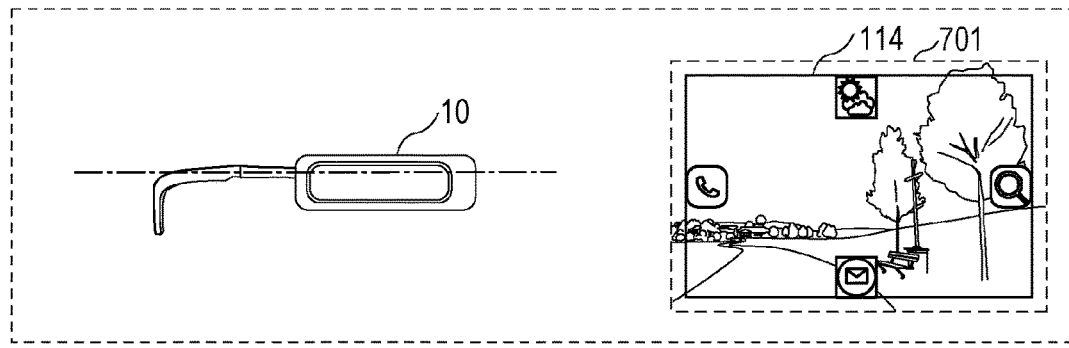
FIG. 12A illustrates a controller in the first embodiment which maintains a display and terminates the maintaining of the display.
Figure 12B:
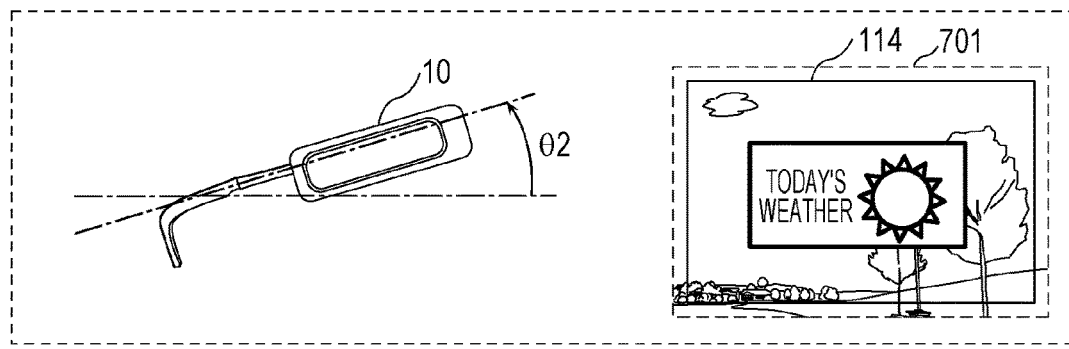
FIG. 12B illustrates a controller in the first embodiment which maintains a display and terminates the maintaining of the display.

In step S102, the controller 113 acquires the attitude information created by the attitude detector 111 in step S101, and causes the displayer 114 to display the display information associated with the attitude of the head-mounted display apparatus 10, the attitude being indicated in the attitude information. Step S101 is equivalent to the state in FIG. 12B. In FIG. 12B, information about a weather forecast is displayed on the displayer 114 because the attitude of the head-mounted display apparatus 10 has been changed to the upward attitude.

Figure 12C:
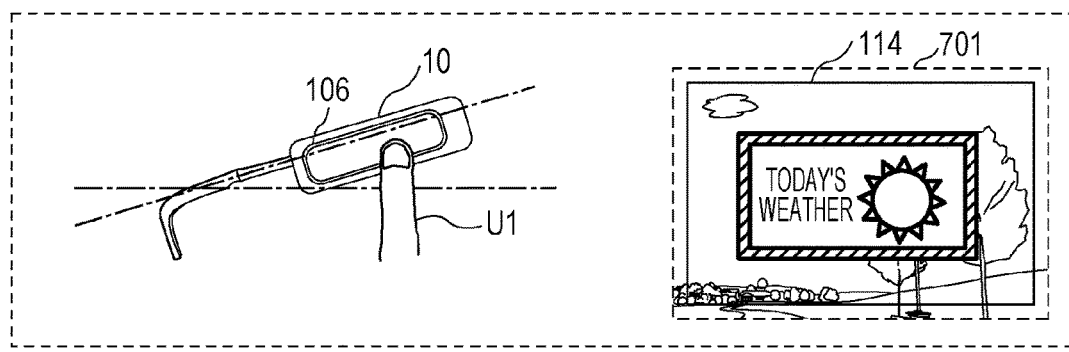
FIG. 12C illustrates a controller in the first embodiment which maintains a display and terminates the maintaining of the display.

In step S103, it is decided whether the manipulation detector 112 has detected a predetermined manipulation performed by the user. If the manipulation detector 112 has detected a predetermined manipulation performed by the user (the result in step S103 is Yes), the sequence proceeds to step S111. If the manipulation detector 112 has not detected a predetermined manipulation performed by the user (the result in step S103 is No), the sequence proceeds to step S104. Step S103 is equivalent to the state in FIG. 12C. In FIG. 12C, the display of the information about a weather forecast on the displayer 114 is maintained because a predetermined manipulation performed by the user (for example, the pressing of the button 106 by a finger U1 of the user) has been detected. At that time, the controller 113 changes the display form by changing the frame of the display of the information to a thick frame while maintaining the display information without switching it.

In step S104, the attitude detector 111 is placed on standby in step S104 until it detects a change in the attitude of the head-mounted display apparatus 10. Upon the detection of a change in the attitude, the attitude detector 111 creates attitude information, after which the sequence proceeds to step S105.

In step S105, the controller 113 acquires the attitude information created by the attitude detector 111 in step S104 and switches information to be displayed by the displayer 114 according to the attitude information.

In step S111, the attitude detector 111 is placed on standby in step S111 until it detects a change in the attitude of the head-mounted display apparatus 10. Upon the detection of a change in the attitude, the attitude detector 111 creates attitude information, after which the sequence proceeds to step S112.

In step S112, the controller 113 maintains the display information on the displayer 114 without switching it, regardless of the attitude information created by the attitude detector 111 in step S111. Step S112 is equivalent to the state in FIG. 12D. The weather forecast information is displayed on the displayer 114 in a state in which the information is enclosed by a thick frame, in spite of the head-mounted display apparatus 10 facing the front.

The order of the detection of a predetermined manipulation (step S103) and the detection of a change in the attitude (step S104 or S111) may be opposite to the order illustrated in FIG. 10.

Figure 12D:
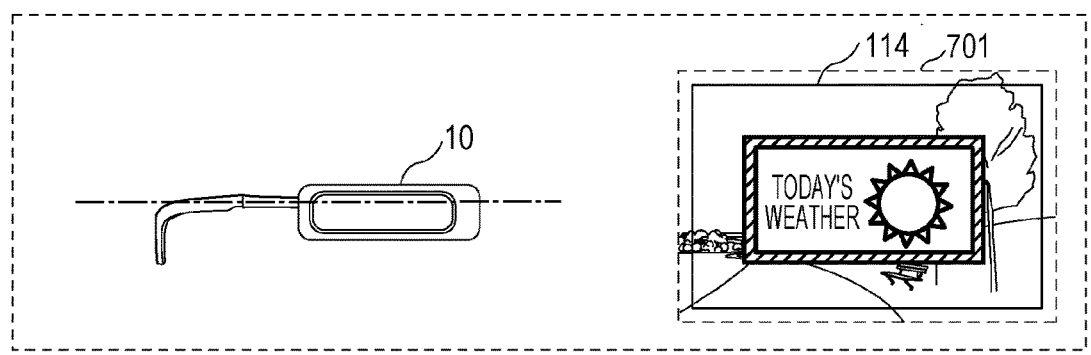
FIG. 12D illustrates a controller in the first embodiment which maintains a display and terminates the maintaining of the display.
Figure 12E:
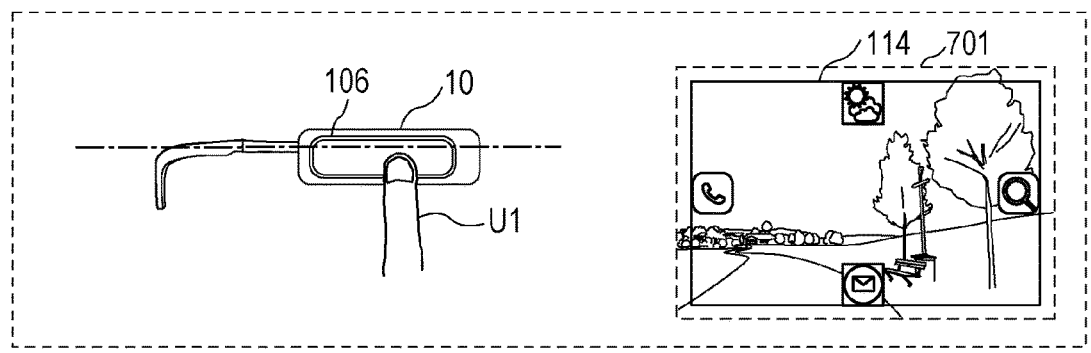
FIG. 12E illustrates a controller in the first embodiment which maintains a display and terminates the maintaining of the display.

In a series of processing described above, if the user performs a predetermined manipulation, the head-mounted display apparatus 10 maintains information to be presented to the user without switching it (see FIG. 12D). Thus, the head-mounted display apparatus 10 can appropriately present information to the user as desired by the user.

Figure 11:
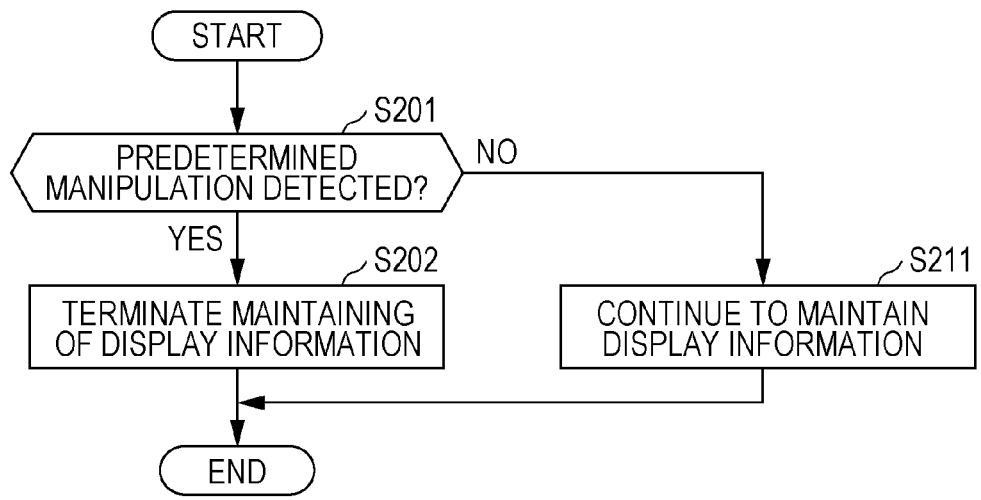
FIG. 11 is a flowchart of processing performed by the controller in the first embodiment to terminate the maintaining of a display.

FIG. 11 is a flowchart of processing performed by the controller 113 in this embodiment to terminate the maintaining of a display.

In step S201, it is decided whether the manipulation detector 112 has detected a predetermined manipulation performed by the user (for example, the pressing of the button 106 by the finger U1 of the user, which is also referred to as a subsequent manipulation). If the manipulation detector 112 has detected a predetermined manipulation performed by the user (the result in step S201 is Yes), the sequence proceeds to step S202. If the manipulation detector 112 has not detected a predetermined manipulation performed by the user (the result in step S201 is No), the sequence proceeds to step S211.

In step S202, the controller 113 terminates the maintaining of the information to be displayed by the displayer 114. That is, the controller 113 makes the information to be displayed by the displayer 114 ready for being switched. At that time, the controller 113 may switch the display information to be displayed on the displayer 114 or may delete the display on the displayer 114 (see FIG. 12E) according to the attitude detected by the attitude detector 111.

In step S211, the controller 113 continues to maintain information to be displayed by the displayer 114.

Thus, the head-mounted display apparatus 10 can appropriately terminate the maintaining of the display information to be displayed by the displayer 114.

The controller 113 may perform the above processing on all information to be displayed by the displayer 114 in a consistent manner or may decide for each piece of information whether to perform the above processing according to the amount of display information, which will be specifically described below by using two examples of images. In a first example, the number of images included in display information is used as the amount of information. In a second example, the number of characters included in display information is used as the amount of information.

Figure 13:
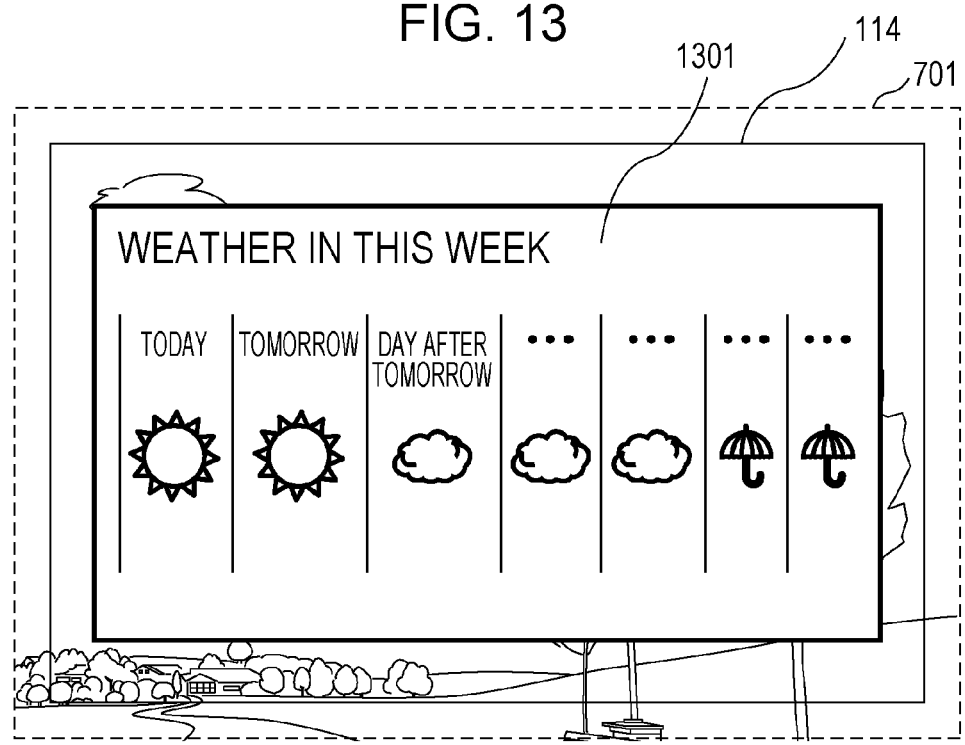
FIG. 13 illustrates display information, in the first embodiment, that includes a large number of images.

FIG. 13 illustrates display information, in the first embodiment, that includes a large number of images. A first exemplary method will be described with reference to FIG. 13, which is a method of deciding whether to perform the above processing according to the number of images included in display information.

In FIG. 13, an image 1301 to be displayed by the displayer 114 indicates weather in one week. The image 1301 is an example of an image that includes much more information than the image 801 that indicates the weather of a day. It can be thought that it takes a longer time for the user to grasp information indicated on the image 1301 when compared with the image 801. By contrast, it can be thought that it takes a short time (several seconds, for example) for the user to grasp information on the image 801 that indicates the weather of a day.

Therefore, the controller 113 may decide whether to perform the series of processing illustrated in FIG. 10 according to the result of a decision made by the decider 115.

If the number of images included on the image to be displayed on the displayer 114 exceeds, for example, 3, the decider 115 decides that the image includes much information. The controller 113 performs the series of processing in FIG. 10 only when the amount of information on the image is large. If the decider 115 decides that the amount of information on the image is small, the controller 113 performs processing to switch the display information according to the detected change in attitude.

In this decision method, when the decider 115 decides that the number of images included on the image 801 is 1 and the controller 113 displays the image 801, the controller 113 performs processing to switch the display information according to the detected change in attitude. When the decider 115 decides that the number of images included on the image 801 is 7 and the controller 113 displays the image 1301, the controller 113 performs processing to maintain the display information according to a predetermined manipulation (processing in FIG. 10).

Figure 14:
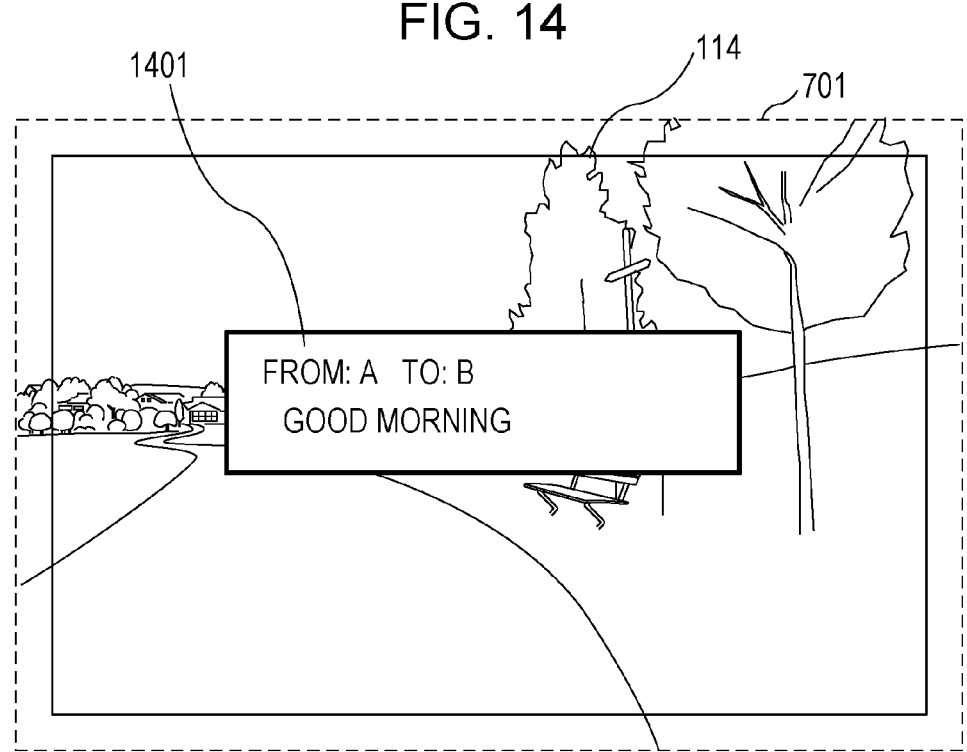
FIG. 14 illustrates display information, in the first embodiment, that includes a small number of characters.
Figure 15:
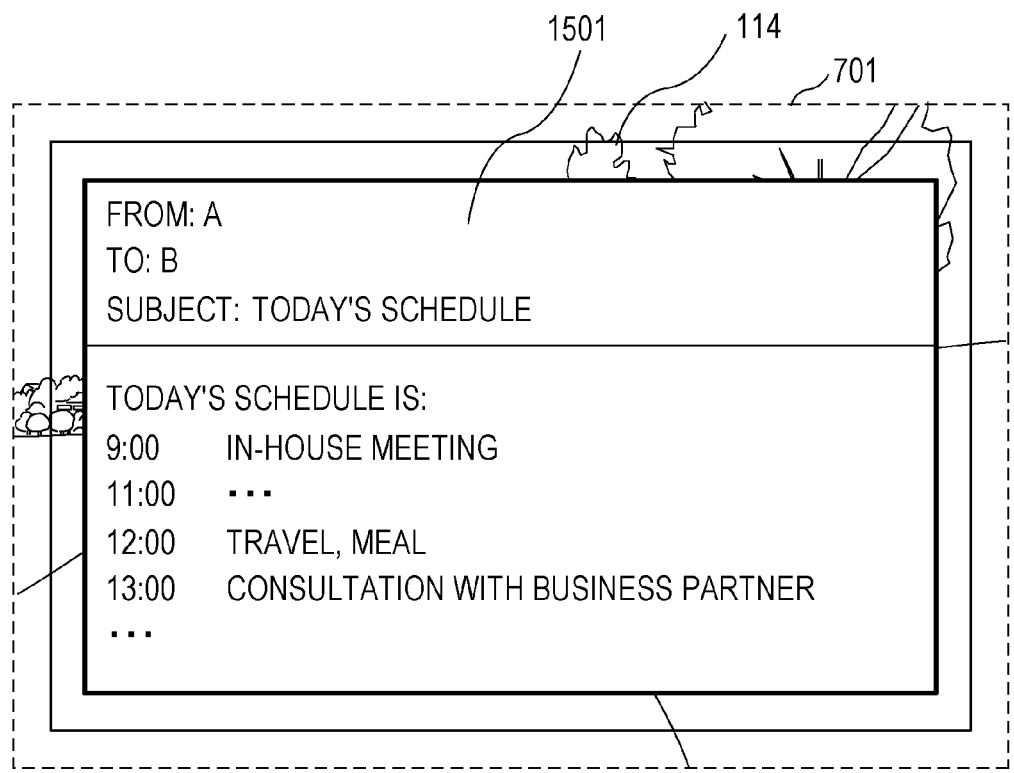
FIG. 15 illustrates display information, in the first embodiment, that includes a large number of characters.

FIG. 14 illustrates display information, in this embodiment, that includes a small number of characters. FIG. 15 illustrates display information, in this embodiment, that includes a large number of characters. A second exemplary method will be described with reference to FIGS. 14 and 15, which is a method of deciding whether to perform the above processing according to the number of characters included in display information.

An image 1401 illustrated in FIG. 14 includes a relatively small number of characters (about 15 characters, for example). An image 1501 illustrated in FIG. 15 includes a relatively large number of characters (about 100 characters, for example).

If the number of characters included on an image to be displayed by the displayer 114 exceeds, for example, 20, the decider 115 decides that the amount of information is large. Only in this case, the controller 113 performs the series of processing illustrated in FIG. 10. Otherwise, the controller 113 performs processing to switch the display information according to the detected change in attitude.

In the decision of the number of characters, the decider 115 may decide the number of characters excluding fixed character strings in the display information. If, for example, the display information is mail, the decider 115 may exclude "From" indicating a transmission source or "To" indicating a transmission destination and may count the number of remaining characters. This is because these fixed character strings do not have a meaning specific to the display information, so it cannot be thought that the user strives to understand the meanings of the fixed character strings.

When the decider 115 makes a decision about the number of characters included in one line, the decider 115 may further consider the number of characters per line, the number of lines, a character display size, and the like. Specifically, for example, many characters are included in one line, there are many lines, or the character display size is small, the decider 115 may decide that the amount of information is large.

Therefore, if an image is such that it takes a relative long time for the user to grasp the image, the user can maintain the display information by performing a predetermined manipulation on the head-mounted display apparatus 10. If an image is such that it does not take so long time for the user to grasp the image, the user can switch the display information according to the attitude. The user can use the head-mounted display apparatus 10 to reliably obtain information without losing the convenience of switching display information.

As described above, the head-mounted display apparatus in this embodiment can appropriately present information to the user as desired by the user. In particular, when the user fixes (maintains) the display of information by performing a predetermined manipulation on the basis of the user's own decision, the head-mounted display apparatus can display necessary information regardless of the attitude of the head-mounted display apparatus. Thus, the user not only can collect information through an intuitive natural motion without making persons around the user feel uncomfortable but also can grasp information that is such that it takes a relative long time for the user to grasp the information.

Second Embodiment

In this embodiment, a head-mounted display apparatus and the like that appropriately present information to a user as desired by the user will be described. More specifically, a head-mounted display apparatus and the like will be described that display information desired by the user according to the user's manipulation.

Figure 16:
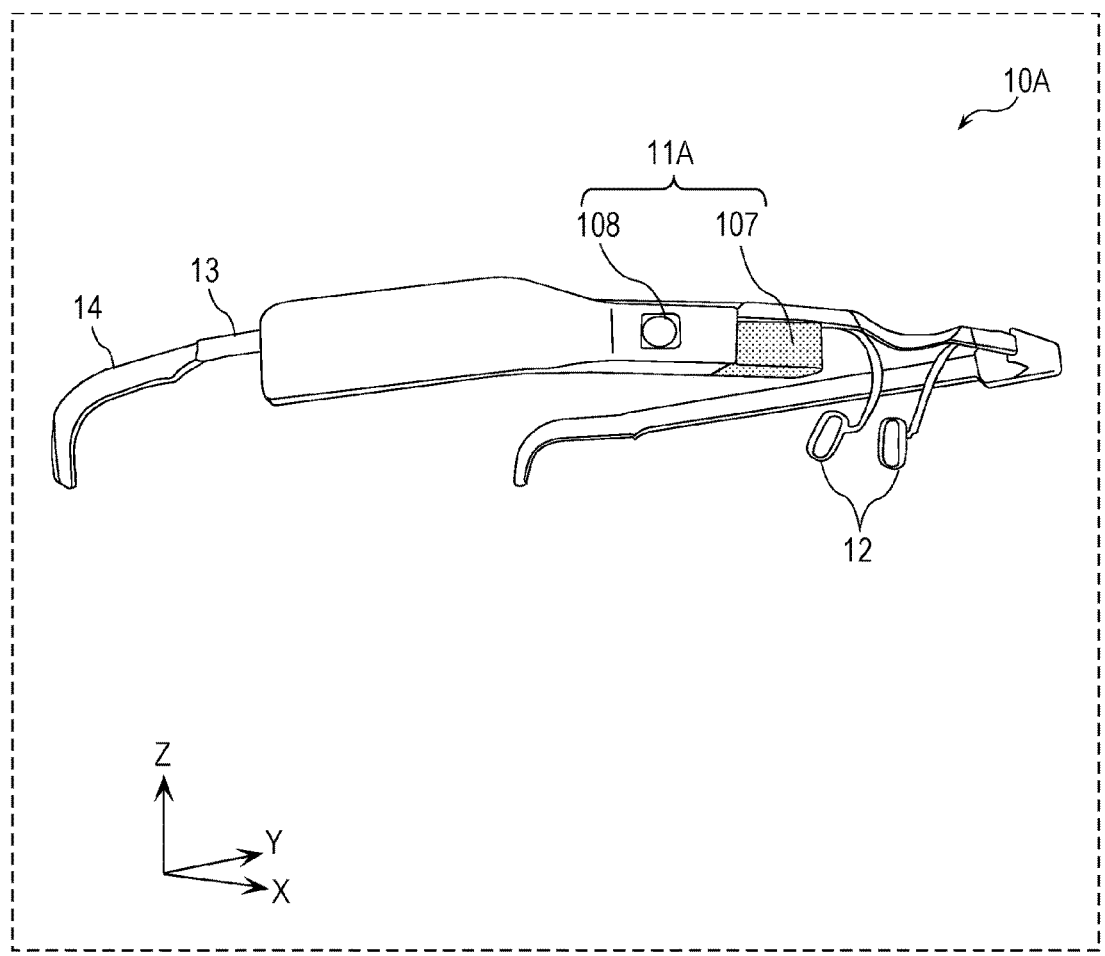
FIG. 16 is an outside shape of a head-mounted display apparatus in a second embodiment.

FIG. 16 is an outside shape of a head-mounted display apparatus 10A in this embodiment.

Although, as illustrated in FIG. 16, the head-mounted display apparatus 10A has an outside shape similar to the outside shape of the head-mounted display apparatus 10 in the first embodiment, the head-mounted display apparatus 10A differs from the head-mounted display apparatus 10 in that the head-mounted display apparatus 10A has a main body 11A. This difference will be described below as a difference in the hardware structure.

Figure 17:
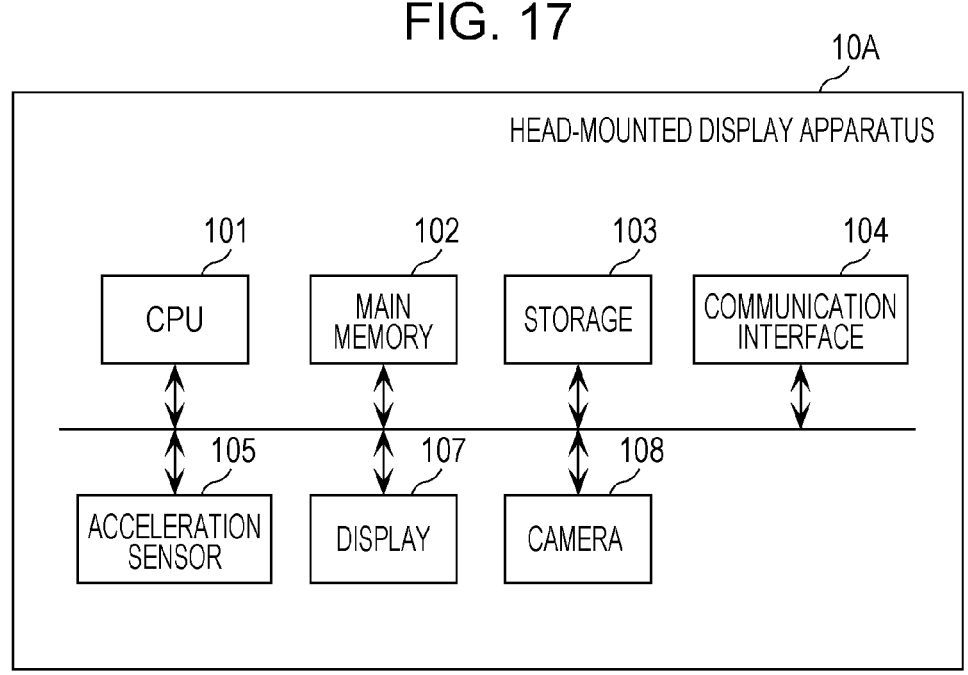
FIG. 17 is a block diagram illustrating the hardware structure of the head-mounted display apparatus in the second embodiment.

FIG. 17 is a block diagram illustrating the hardware structure of the head-mounted display apparatus 10A in this embodiment.

Although, as illustrated in FIG. 17, the head-mounted display apparatus 10A has a hardware structure similar to the hardware structure of the head-mounted display apparatus 10 in the first embodiment, the head-mounted display apparatus 10A differs from the head-mounted display apparatus 10 in that the head-mounted display apparatus 10A has a camera 108. In other respects, the structure is the same as in the first embodiment, so their descriptions will be omitted.

The camera 108 is an imaging apparatus that creates an image by capturing a surrounding image. The camera 108 is disposed on the head-mounted display apparatus 10A at a position and an angle at which the camera 108 can capture an image in the forward direction (positive direction of the X direction). The camera 108 may be a visible light camera that captures a surrounding image with visible light or an infrared camera that captures a surrounding mage with infrared rays.

Figure 18:
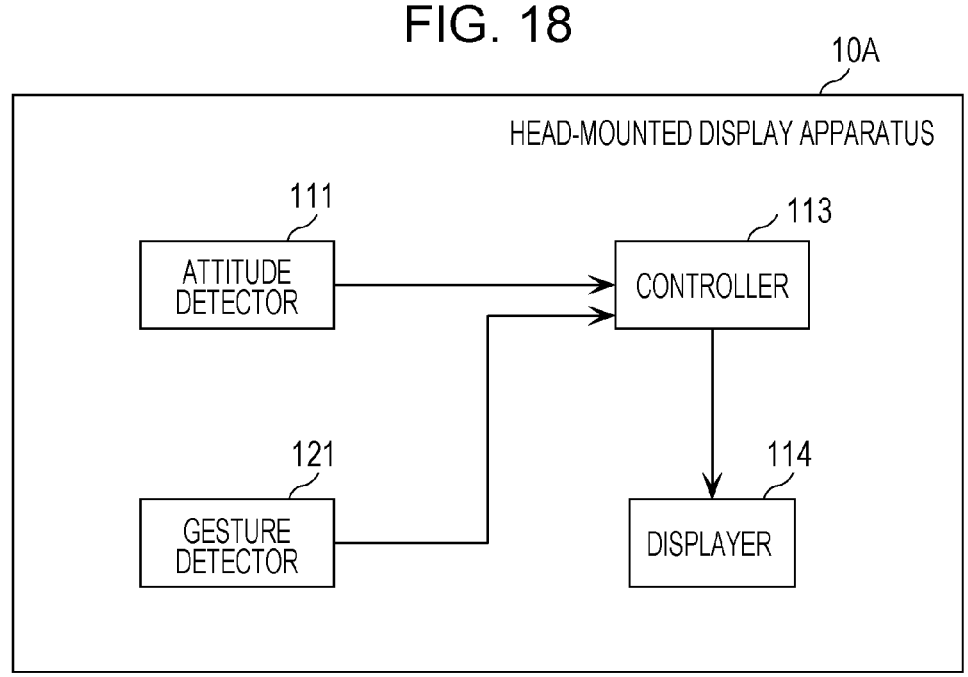
FIG. 18 is a block diagram illustrating the functional structure of the head-mounted display apparatus in the second embodiment.

FIG. 18 is a block diagram illustrating the functional structure of the head-mounted display apparatus 10A in the second embodiment.

Although, as illustrated in FIG. 18, the head-mounted display apparatus 10A in this embodiment has a functional structure similar to the functional structure of the head-mounted display apparatus 10, the head-mounted display apparatus 10A differs from the head-mounted display apparatus 10 in that the head-mounted display apparatus 10A has a gesture detector 121. In other respects, the structure is the same as in the first embodiment, so their descriptions will be omitted.

The gesture detector 121 is a processor that detects a swipe gesture manipulation performed by the user in a manipulation space, the wipe gesture manipulation being a gesture manipulation to indicate one direction. The swipe gesture manipulation is the user's motion in which the user moves a hand or the like in one direction like a sweep motion. The swipe gesture manipulation may be simply referred to as the gesture manipulation.

Specifically, the gesture detector 121 captures an image of a manipulation space ahead of the head-mounted display apparatus 10A with the camera 108. In the capturing of the manipulation space, a plurality of still images (frames) are created; a moving picture is taken or a still picture is taken a plurality of times. The manipulation space is a space in which the user performs a swipe gesture manipulation; the manipulation space occupies part or the whole of a space within which the camera 108 can capture an image.

The gesture detector 121 detects a motion of the hand of the user from the frames obtained by photography and creates gesture information, which indicates the motion of the hand. If the camera 108 is a visible light camera, it extracts, for example, skin-color portions on the image to distinguish the user's hand from other subjects, after which the camera 108 detects the motion of the user's hand and creates gesture information. If the camera 108 is an infrared camera, it detects the motion of the user's hand by detecting infrared rays released from the user's hand and creates gesture information. The gesture manipulation is not limited to a motion of a hand; the gesture manipulation may be a motion of another portion of the user's body. The gesture detector 121 is implemented by the CPU 101, the main memory 102, the storage 103, the camera 108, and the like.

The gesture detector 121 may detect swipe gesture manipulations only in four directions, which are the upward, downward, leftward, and rightward directions, when viewed from the user. It can be thought that a direction intended by the user's swipe gesture manipulation does not exactly match the direction in which the user actually moves the user's hand so as to sweep something. For example, even if the user intends to perform an upward swipe gesture manipulation, the direction in which the user actually moves the user's hand may not be the accurate upward direction; the actual direction may be oriented in a direction that is slightly inclined with respect to the upward direction. If the gesture detector 121 is structured so that it detects swipe gesture manipulations only in the above four directions, it is possible to determine a direction, as described above, that is slightly deviated from the accurate upward direction as the upward direction.

The controller 113 displays icons at portions, on the display area of the displayer 114, in the upward, downward, leftward, and rightward directions, each icon indicating one of the four information items that is associated with the direction, as in the first embodiment. These icons help the user know that what information is displayed by performing a swipe gesture manipulation in what direction.

Figure 19:
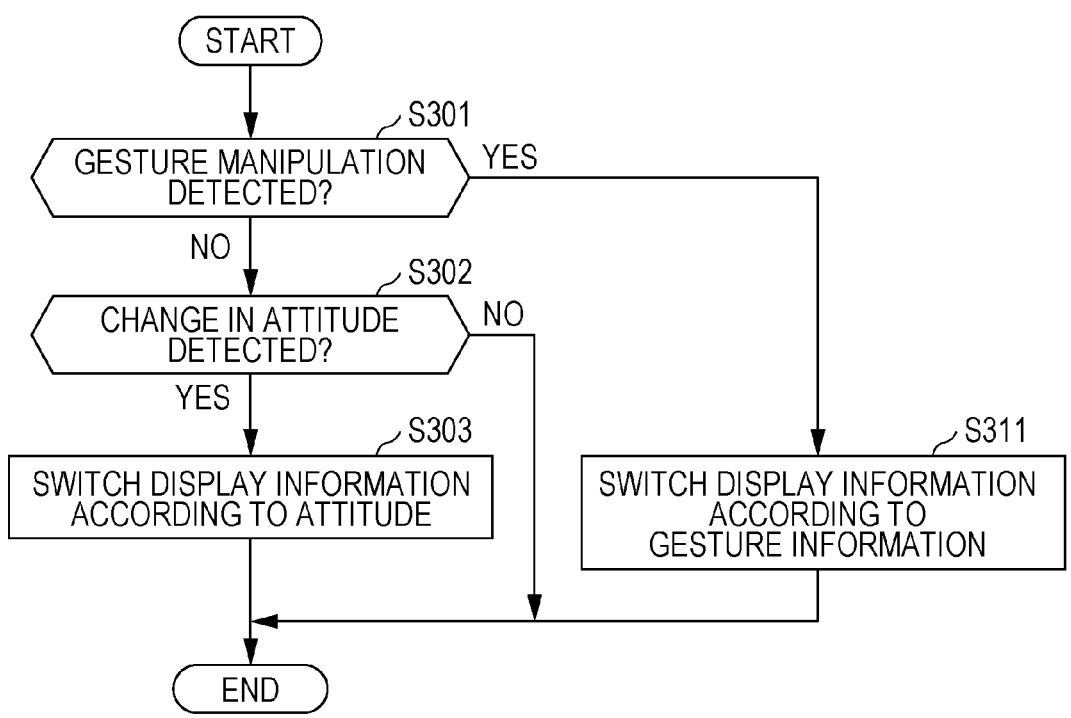
FIG. 19 is a flowchart of processing performed by the controller in the second embodiment to switch a display.
Figure 20A:
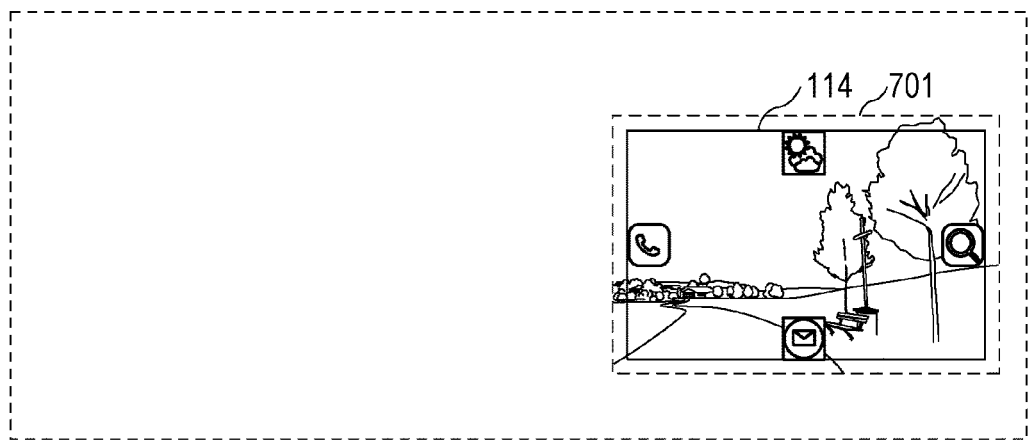
FIG. 20A illustrates display information in the second embodiment.
Figure 20B:
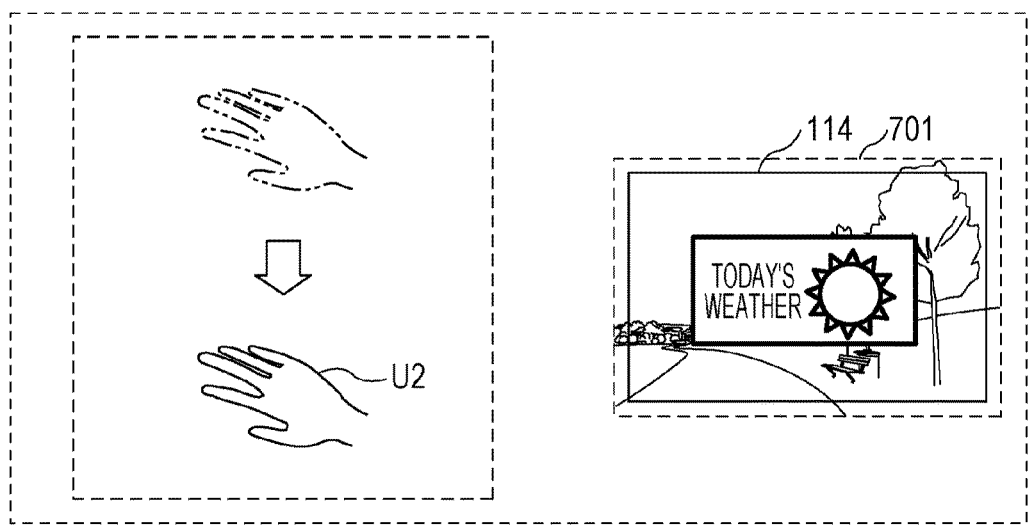
FIG. 20B illustrates display information in the second embodiment.
Figure 20C:
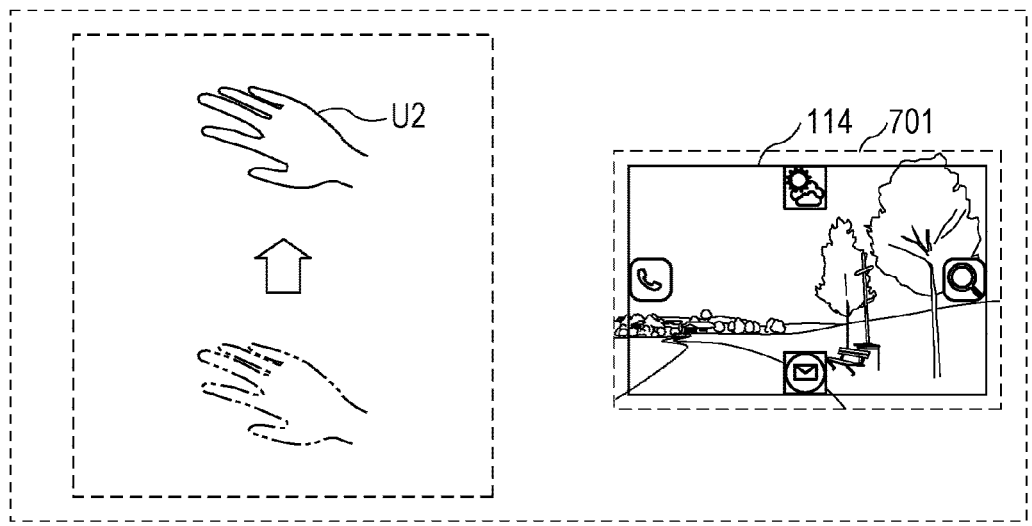
FIG. 20C illustrates display information in the second embodiment.

FIG. 19 is a flowchart of processing performed by the controller 113 in this embodiment to switch a display. FIGS. 20A, 20B and 20C schematically illustrate a series of flow in which the controller 113 in the second embodiment maintains a display and terminates the maintaining of the display. A series of flow in which the controller 113 maintains a display and terminates the maintaining of the display will be described with reference to FIGS. 19, 20A, 20B and 20C.

First, it is assumed that the attitude of the head-mounted display apparatus 10A is oriented to the front and that nothing is displayed on the displayer 114. This state is equivalent to the state in FIG. 20A.

In step S301, it is decided whether the gesture detector 121 has detected a swipe gesture manipulation performed by the user. If the gesture detector 121 has detected a swipe gesture manipulation (the result in step S301 is Yes), the gesture detector 121 creates gesture information, after which the sequence proceeds to step S311. If the gesture detector 121 has not detected a swipe gesture manipulation (the result in step S301 is No), the sequence proceeds to step S302. Step S301 is equivalent to the state in FIG. 20B. In FIG. 20B, information about a weather forecast is displayed on the displayer 114 in response to a swipe gesture manipulation performed by the user from above to down (downward manipulation) with a hand U2, the weather forecast being associated with the upward direction, which corresponds to an upper portion that is the start point of the swipe gesture manipulation.

In step S302, it is decided whether the attitude detector 111 has detected a change in the attitude of the head-mounted display apparatus 10A. If the attitude detector 111 has detected a change in the attitude, the attitude detector 111 creates attitude information, after which the sequence proceeds to step S303.

In step S303, the controller 113 switches information to be displayed by the displayer 114 according to the attitude information created by the attitude detector 111 in step S302.

In step S311, the controller 113 acquires the gesture information created by the gesture detector 121 in step S301 and switches information to be displayed by the displayer 114 according to the gesture information.

It is also possible to delete the display (terminate the displaying of information) by performing a swipe gesture manipulation indicating a direction opposite to the direction of the swipe gesture manipulation performed to display information on the displayer 114 (see FIG. 20C).

The head-mounted display apparatus 10A can be combined with the head-mounted display apparatus 10 in the first embodiment. Specifically, when the head-mounted display apparatus 10A further has the button 106 and manipulation detector 112, a display can be maintained according to a predetermined manipulation performed by the user.

As described above, the head-mounted display apparatus in this embodiment can appropriately present information to the user as desired by the user. In particular, it is possible to switch display information by performing a swipe manipulation instead of changing the attitude of the head-mounted display apparatus. Therefore, while, for example, facing the front, the user can cause the head-mounted display apparatus to display necessary information by performing a swipe manipulation and can grasp the information; the necessary information would otherwise be displayed by changing the attitude of the head-mounted display apparatus. Thus, the user not only can collect information through an intuitive natural motion without making persons around the user feel uncomfortable but also can grasp information that is such that it takes a relative long time for the user to grasp the information.

In the above embodiments, each constituent element may be structured by using special hardware or may be implemented by executing a software program suitable to the constituent element. Alternatively, to implement each constituent element, a CPU, a processor, or another program executor may read out and execute a software program recorded in a hard disk, a semiconductor memory, or another recording medium. Software that implements the head-mounted display apparatuses and the like in the above embodiments is a program described below.

That is, this program causes a computer to execute a control method of controlling a head-mounted display apparatus worn on the head of a user; the head-mounted display apparatus has a displayer on which information is displayed; the control method includes an attitude detecting step of detecting an attitude of the head-mounted display apparatus, a manipulation detecting step of detecting a predetermined manipulation performed on the head-mounted display apparatus, and a control step of switching information to be displayed by the displayer according to a change in the attitude detected in the attitude detecting step; in the control step, if the predetermined manipulation is detected in the manipulation detecting step, even if there is a change in the attitude detected in the attitude detecting step, the information being displayed by the displayer is maintained without being switched.

This program causes a computer to execute a control method of controlling a head-mounted display apparatus worn on the head of a user; the head-mounted display apparatus has a displayer on which information is displayed; the control method includes an attitude detecting step of detecting an attitude of the head-mounted display apparatus, a gesture detecting step of detecting a swipe gesture manipulation that indicates one direction, the swipe gesture manipulation being performed in a manipulation space, and a control step of switching information to be displayed by the displayer according to a change in the attitude detected in the attitude detecting step; in the control step, the information to be displayed by the displayer is switched according to the direction indicated by the swipe gesture manipulation.

So far, the head-mounted display apparatus and the like in one or a plurality of aspects have been described according to the embodiments. However, the present disclosure is not limited to these embodiments. The range of one or a plurality of aspects may include embodiments in which various variations that a person having ordinary skill in the art thinks of are applied to the embodiments described above and may also include embodiments in which constituent elements in different embodiments are combined, without departing from the intended scope of the present disclosure.

The present disclosure can be applied to a head-mounted display apparatus that appropriately presents information to a user as desired by the user.

What is claimed is:

1. A head-mounted display apparatus worn on a head of a user, the apparatus comprising:
   an attitude sensor that detects an attitude of the head-mounted display apparatus;
   a gesture sensor that detects a swipe gesture manipulation that indicates one direction, the swipe gesture manipulation being performed in a manipulation space,
   a display,
   a processor, and
   a memory having a program stored in the memory, the program causing the processor to execute operations in which
   first display information to be displayed on the display is switched to second display information according to a change in the attitude detected by the attitude sensor, and
   the first display information to be displayed on the display is switched to the second display information according to the direction indicated by the swipe gesture manipulation detected by the gesture sensor.

2. The head-mounted display apparatus according to claim 1, wherein:
   the attitude sensor creates attitude information, which indicates a direction to which the attitude has been changed from a reference attitude, the direction being one of an upward direction, a downward direction, a leftward direction, and a rightward direction when viewed from the user; and
   in the operations,
   four information items associated with the upward direction, downward direction, leftward direction, and rightward direction are stored in the memory as information to be displayed on the display,
   icons are displayed at portions, on a display area of the display, in the upward direction, downward direction, leftward direction, and rightward direction, each icon indicating one of the four information items that is associated with the upward direction, downward direction, leftward direction, or rightward direction, whichever is applicable, and
   when the gesture sensor detects the swipe gesture manipulation, information associated with a direction indicating a start point of the swipe gesture manipulation is displayed on the display.

3. The head-mounted display apparatus according to claim 1, further comprising a manipulation sensor that detects a predetermined manipulation performed on the head-mounted display apparatus, wherein
   when the manipulation sensor detects the predetermined manipulation performed by the user, even if there is a change in the attitude detected by the attitude sensor, the first display information being displayed on the display is maintained without being switched to the second display information.

4. A method of controlling a head-mounted display apparatus worn on a head of a user, the head-mounted display apparatus having a display that displays information, the method comprising:
   detecting an attitude of the head-mounted display apparatus by using an attitude sensor;
   detecting a swipe gesture manipulation that indicates one direction by using a gesture sensor, the swipe gesture manipulation being performed in a manipulation space; and
   causing a processor to switch first display information to be displayed on the display to second display information according to a change in the attitude detected in the detecting an attitude of the head-mounted display apparatus; wherein
   in the causing, the first display information to be displayed on the display is switched to the second display information according to the direction indicated by the swipe gesture manipulation detected in the detecting a swipe gesture manipulation.

* * * * *